United States Patent
Huang et al.

(10) Patent No.: US 12,408,111 B2
(45) Date of Patent: Sep. 2, 2025

(54) WAKE-UP SIGNAL DESIGN FOR MULTIPLE MULTICAST SESSIONS

(71) Applicant: QUALCOMM INCORPORATED, San Diego, CA (US)

(72) Inventors: Min Huang, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 17/997,333

(22) PCT Filed: Jul. 3, 2020

(86) PCT No.: PCT/CN2020/100201
§ 371 (c)(1),
(2) Date: Oct. 27, 2022

(87) PCT Pub. No.: WO2022/000484
PCT Pub. Date: Jan. 6, 2022

(65) Prior Publication Data
US 2023/0171699 A1    Jun. 1, 2023

(51) Int. Cl.
*H04W 52/02* (2009.01)
*H04W 4/06* (2009.01)
*H04W 72/232* (2023.01)

(52) U.S. Cl.
CPC ......... *H04W 52/0235* (2013.01); *H04W 4/06* (2013.01); *H04W 72/232* (2023.01)

(58) Field of Classification Search
None
See application file for complete search history.

(56) References Cited

U.S. PATENT DOCUMENTS

2003/0157949 A1*  8/2003  Sarkkinen ............. H04W 72/30
                                                               455/503
2003/0157952 A1*  8/2003  Sarkkinen ........... H04W 52/327
                                                                455/69

(Continued)

FOREIGN PATENT DOCUMENTS

CN        109104756 A    12/2018
CN        110831262 A     2/2020

(Continued)

OTHER PUBLICATIONS

Huawei., et al., "PDCCH Based Power Saving Signal/Channel", 3GPP TSG RAN WG1 Meeting #96bis, R1-1903988, Xi'an, China, Apr. 8-12, 2019, 7 Pages, Section 2, The whole document.

(Continued)

*Primary Examiner* — Clemence S Han
(74) *Attorney, Agent, or Firm* — Holland & Hart LLP

(57) ABSTRACT

Methods, systems, and devices for wireless communications are described. One method for providing a wake-up signal to user equipments (UEs) that support multiple multicast sessions may include a base station transmitting configuration information to a UE indicating a wake-up signal configuration for one or more multicast sessions. Accordingly, the UE may monitor the one or more multicast sessions for a wake-up signal and receive, prior to an active duration of a multicast session, a wake-up signal from the base station. The wake-up signal may include control signaling indicating to the UE which of a set of multicast sessions the UE is to monitor. The UE may determine which multicast sessions to monitor based on the received control signaling.

120 Claims, 18 Drawing Sheets

(56) References Cited

U.S. PATENT DOCUMENTS

| | | | | |
|---|---|---|---|---|
| 2012/0311101 | A1* | 12/2012 | Chao | H04L 67/12 |
| | | | | 709/219 |
| 2015/0223028 | A1* | 8/2015 | Wang | H04W 4/06 |
| | | | | 370/312 |
| 2017/0026431 | A1* | 1/2017 | Oren | H04L 69/24 |
| 2020/0037247 | A1* | 1/2020 | Liao | H04W 52/0216 |

FOREIGN PATENT DOCUMENTS

| | | |
|---|---|---|
| CN | 110913460 A | 3/2020 |
| EP | 3493603 A1 * | 6/2019 |
| WO | WO-2018149348 A1 | 8/2018 |
| WO | WO-2020034074 A1 | 2/2020 |

OTHER PUBLICATIONS

International Search Report and Written Opinion—PCT/CN2020/100201—ISA/EPO—Mar. 31, 2021.

* cited by examiner

WAKE-UP SIGNAL DESIGN FOR MULTIPLE MULTICAST SESSIONS

CROSS REFERENCE

The present application is a 371 national stage filing of International PCT Application No. PCT/CN2020/100201 by HUANG et al. entitled "WAKE-UP SIGNAL DESIGN FOR MULTIPLE MULTICAST SESSIONS," filed Jul. 3, 2020, which is assigned to the assignee hereof, and which is expressly incorporated by reference in its entirety herein.

FIELD OF TECHNOLOGY

The following relates generally to wireless communications and more specifically to wake-up signal design for multiple multicast sessions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support multicast services (e.g., a multimedia broadcast multicast service (MBMS)). In some cases, a UE may support multiple multicast sessions where the UE receives information from a base station during multiple time periods or via multiple channels. The UE may receive a wake-up signal associated with each multicast sessions indicating the UE to monitor the multicast sessions. However, monitoring multiple multicast sessions for wake-up signals may cause the UE to monitor active durations during which the base station does not transmit information to the UE. Accordingly, a UE may inefficiently use resources by monitoring multiple multicast sessions, which may result in increased power consumption.

SUMMARY

The described techniques relate to improved methods, systems, devices, and apparatuses that support wake-up signal design for multiple multicast sessions. Generally, the techniques herein describe a wake-up signal for a user equipment (UE) that supports multiple multicast sessions, which may include a base station transmitting configuration information to a UE indicating a wake-up signal configuration for one or more multicast sessions. The UE may monitor the one or more multicast sessions for a wake-up signal and receive, prior to an active duration of a multicast session, a wake-up signal from the base station. The wake-up signal may indicate to the UE which of the multicast sessions the UE is to monitor. In some cases, the UE may determine which multicast sessions to monitor based on one or more indicators in the wake-up signal. Implementing various aspects of the described techniques may enable efficient use of resources and a decreased power consumption at the UE.

A method of wireless communications at a UE is described. The method may include receiving, from a base station, a configuration indicating one or more wake-up signal configurations associated with a set of multicast sessions configured for the UE, monitoring, during a wake-up occasion of a first multicast session of the set of multicast sessions and before an active duration of the first multicast session, for a wake-up signal based on the one or more wake-up signal configurations, receiving the wake-up signal based on the monitoring, the wake-up signal including an indication of which of the set of multicast sessions the UE is to monitor, and determining whether to monitor one or more of the set of multicast sessions based on the indication of which of the set of multicast sessions the UE is to monitor.

An apparatus for wireless communications at a UE is described. The apparatus may include a processor, memory coupled with the processor, and instructions stored in the memory. The instructions may be executable by the processor to cause the apparatus to receive, from a base station, a configuration indicating one or more wake-up signal configurations associated with a set of multicast sessions configured for the UE, monitor, during a wake-up occasion of a first multicast session of the set of multicast sessions and before an active duration of the first multicast session, for a wake-up signal based on the one or more wake-up signal configurations, receive the wake-up signal based on the monitoring, the wake-up signal including an indication of which of the set of multicast sessions the UE is to monitor, and determine whether to monitor one or more of the set of multicast sessions based on the indication of which of the set of multicast sessions the UE is to monitor.

Another apparatus for wireless communications at a UE is described. The apparatus may include means for receiving, from a base station, a configuration indicating one or more wake-up signal configurations associated with a set of multicast sessions configured for the UE, monitoring, during a wake-up occasion of a first multicast session of the set of multicast sessions and before an active duration of the first multicast session, for a wake-up signal based on the one or more wake-up signal configurations, receiving the wake-up signal based on the monitoring, the wake-up signal including an indication of which of the set of multicast sessions the UE is to monitor, and determining whether to monitor one or more of the set of multicast sessions based on the indication of which of the set of multicast sessions the UE is to monitor.

A non-transitory computer-readable medium storing code for wireless communications at a UE is described. The code may include instructions executable by a processor to receive, from a base station, a configuration indicating one or more wake-up signal configurations associated with a set of multicast sessions configured for the UE, monitor, during a wake-up occasion of a first multicast session of the set of multicast sessions and before an active duration of the first multicast session, for a wake-up signal based on the one or more wake-up signal configurations, receive the wake-up signal based on the monitoring, the wake-up signal including an indication of which of the set of multicast sessions the UE is to monitor, and determine whether to monitor one or more of the set of multicast sessions based on the indication of which of the set of multicast sessions the UE is to monitor.

Some examples of the method, apparatuses, and non-transitory computer-readable medium described herein may further include operations, features, means, or instructions for receiving a set of indicators corresponding to the set of multicast sessions in the wake-up signal, where each of the set of indicators corresponds to a respective multicast session of the set of multicast sessions, determining which of the set of multicast sessions to the UE may be to monitor based on the set of indicators, and monitoring the one or more of the set of multicast sessions based on determining which of the set of multicast sessions to the UE may be to monitor.

In some examples of the method, apparatuses, and non-transitory computer-readable medium described herein, determining whether to monitor one or more of the set of multicast sessions may include operations, features, means, or instructions for determining to refrain from monitoring for a downlink control channel during a second active duration associated with a second multicast session based on the indication including a wake-up indicator having a value indicating that the UE may be to refrain from monitoring for the downlink control channel of the second multicast session.

In some examples of the method, apparatuses, and non-transitory computer-readable medium described herein, determining whether to monitor one or more of the set of multicast sessions may include operations, features, means, or instructions for determining to monitor for a downlink control channel during a second active duration associated with a second multicast session based on the indication including a wake-up indicator having a value indicating that the UE may be to monitor for the downlink control channel of the second multicast session.

In some examples of the method, apparatuses, and non-transitory computer-readable medium described herein, determining whether to monitor one or more of the set of multicast sessions may include operations, features, means, or instructions for determining to monitor for a second wake-up signal before a second active duration associated with a second multicast session based on the indication including a wake-up indicator having a value indicating that the UE may be to monitor for the second wake-up signal of the second multicast session.

In some examples of the method, apparatuses, and non-transitory computer-readable medium described herein, determining whether to monitor one or more of the set of multicast sessions may include operations, features, means, or instructions for determining to monitor for a downlink control channel during the active duration of the first multicast session based on the indication including a first wake-up indicator having a first value indicating that the UE may be to monitor for the downlink control channel of the first multicast session, and determining to monitor a second multicast session of the set of multicast sessions based on the indication including a second wake-up indicator having a second value indicating that the UE may be to monitor for the second multicast session.

Some examples of the method, apparatuses, and non-transitory computer-readable medium described herein may further include operations, features, means, or instructions for monitoring for a second wake-up signal or a second downlink control channel associated with the second multicast session based on determining to monitor the second multicast session.

Some examples of the method, apparatuses, and non-transitory computer-readable medium described herein may further include operations, features, means, or instructions for monitoring all active durations associated with the at least one multicast session during a wake-up cycle of the first multicast session based on the indication.

In some examples of the method, apparatuses, and non-transitory computer-readable medium described herein, determining whether to monitor one or more of the set of multicast sessions may include operations, features, means, or instructions for refraining from monitoring the one or more of the set of multicast sessions during a wake-up cycle of the first multicast session based on the indication.

In some examples of the method, apparatuses, and non-transitory computer-readable medium described herein, receiving the wake-up signal may include operations, features, means, or instructions for receiving DCI that includes the wake-up signal, the DCI associated with a wake-up multicast radio network temporary identifier common to all UEs in a cell supported by the base station.

Some examples of the method, apparatuses, and non-transitory computer-readable medium described herein may further include operations, features, means, or instructions for receiving a downlink control message from the base station indicating respective wake-up multicast radio network temporary identifiers for each of the set of multicast sessions configured for the UE.

In some examples of the method, apparatuses, and non-transitory computer-readable medium described herein, the downlink control message may be received via RRC signaling, DCI, or a medium access control (MAC) control element (MAC-CE).

In some examples of the method, apparatuses, and non-transitory computer-readable medium described herein, receiving the one or more wake-up signal configurations may include operations, features, means, or instructions for receiving a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

In some examples of the method, apparatuses, and non-transitory computer-readable medium described herein, receiving the one or more wake-up signal configurations may include operations, features, means, or instructions for receiving at least one of a number of multicast sessions associated with the set of multicast sessions, a discontinuous reception configuration, or one or more radio network temporary identifiers associated with the set of multicast sessions.

In some examples of the method, apparatuses, and non-transitory computer-readable medium described herein, receiving the one or more wake-up signal configurations may include operations, features, means, or instructions for receiving the one or more wake-up signal configurations via RRC signaling, DCI, or a medium access control (MAC) control element (MAC-CE).

In some examples of the method, apparatuses, and non-transitory computer-readable medium described herein, receiving the wake-up signal may include operations, features, means, or instructions for receiving the wake-up signal before the active duration of a discontinuous reception cycle associated with the first multicast session.

Some examples of the method, apparatuses, and non-transitory computer-readable medium described herein may further include operations, features, means, or instructions for selecting the first multicast session of the set of multicast sessions for monitoring by the UE based on a length of a discontinuous reception cycle associated with the first multicast session.

In some examples of the method, apparatuses, and non-transitory computer-readable medium described herein, the length of the discontinuous reception cycle corresponding to a longest length or shortest length of all multicast sessions of the set of multicast sessions.

A method of wireless communications at a base station is described. The method may include identifying a set of multicast sessions configured for a UE, transmitting one or more wake-up signal configurations for the set of multicast sessions to the UE, the one or more wake-up signal configurations indicating respective identifiers for each of the set of multicast sessions, determining which of the set of multicast sessions the UE is to monitor during a wake-up cycle associated with a first multicast session of the set of multicast sessions, and transmitting a wake-up signal before an active duration of the first multicast session, the wake-up signal indicating which of the set of multicast sessions the UE is to monitor during the wake-up cycle associated with the first multicast session of the set of multicast sessions based on the determining.

An apparatus for wireless communications at a base station is described. The apparatus may include a processor, memory coupled with the processor, and instructions stored in the memory. The instructions may be executable by the processor to cause the apparatus to identify a set of multicast sessions configured for a UE, transmit one or more wake-up signal configurations for the set of multicast sessions to the UE, the one or more wake-up signal configurations indicating respective identifiers for each of the set of multicast sessions, determine which of the set of multicast sessions the UE is to monitor during a wake-up cycle associated with a first multicast session of the set of multicast sessions, and transmit a wake-up signal before an active duration of the first multicast session, the wake-up signal indicating which of the set of multicast sessions the UE is to monitor during the wake-up cycle associated with the first multicast session of the set of multicast sessions based on the determining.

Another apparatus for wireless communications at a base station is described. The apparatus may include means for identifying a set of multicast sessions configured for a UE, transmitting one or more wake-up signal configurations for the set of multicast sessions to the UE, the one or more wake-up signal configurations indicating respective identifiers for each of the set of multicast sessions, determining which of the set of multicast sessions the UE is to monitor during a wake-up cycle associated with a first multicast session of the set of multicast sessions, and transmitting a wake-up signal before an active duration of the first multicast session, the wake-up signal indicating which of the set of multicast sessions the UE is to monitor during the wake-up cycle associated with the first multicast session of the set of multicast sessions based on the determining.

A non-transitory computer-readable medium storing code for wireless communications at a base station is described. The code may include instructions executable by a processor to identify a set of multicast sessions configured for a UE, transmit one or more wake-up signal configurations for the set of multicast sessions to the UE, the one or more wake-up signal configurations indicating respective identifiers for each of the set of multicast sessions, determine which of the set of multicast sessions the UE is to monitor during a wake-up cycle associated with a first multicast session of the set of multicast sessions, and transmit a wake-up signal before an active duration of the first multicast session, the wake-up signal indicating which of the set of multicast sessions the UE is to monitor during the wake-up cycle associated with the first multicast session of the set of multicast sessions based on the determining.

In some examples of the method, apparatuses, and non-transitory computer-readable medium described herein, transmitting the wake-up signal may include operations, features, means, or instructions for transmitting a set of indicators corresponding to the set of multicast sessions in the wake-up signal, the set of indicators indicating which of the set of multicast sessions the UE may be to monitor, where each of the set of indicators corresponds to a respective multicast session of the set of multicast sessions, and where each indicator instructs the UE whether to monitor the respective multicast session.

Some examples of the method, apparatuses, and non-transitory computer-readable medium described herein may further include operations, features, means, or instructions for determining that the UE may be to refrain from monitoring for a downlink control channel during a second active duration associated with a second multicast session, where the wake-up signal includes a wake-up indicator having a value indicating that the UE may be to refrain from monitoring for the downlink control channel of the second multicast session.

Some examples of the method, apparatuses, and non-transitory computer-readable medium described herein may further include operations, features, means, or instructions for determining that the UE may be to monitor for a downlink control channel during a second active duration associated with a second multicast session, where the wake-up signal includes a wake-up indicator having a value indicating that the UE may be to monitor for the downlink control channel of the second multicast session.

Some examples of the method, apparatuses, and non-transitory computer-readable medium described herein may further include operations, features, means, or instructions for determining that the UE may be to monitor for a second wake-up signal before a second active duration associated with a second multicast session, where the wake-up signal includes a wake-up indicator having a value indicating that the UE may be to monitor for the second wake-up signal of the second multicast session.

Some examples of the method, apparatuses, and non-transitory computer-readable medium described herein may further include operations, features, means, or instructions for determining that the UE may be to monitor for a downlink control channel during the active duration of the first multicast session, where the wake-up signal includes a first wake-up indicator having a first value indicating that the UE may be to monitor for the downlink control channel of the first multicast session, and determining that the UE may be to monitor a second multicast session, where the wake-up signal includes a second wake-up indicator having a second value indicating that the UE may be to monitor the second multicast session.

In some examples of the method, apparatuses, and non-transitory computer-readable medium described herein, transmitting the one or more wake-up signal configurations may include operations, features, means, or instructions for transmitting a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

In some examples of the method, apparatuses, and non-transitory computer-readable medium described herein, transmitting the one or more wake-up signal configurations may include operations, features, means, or instructions for transmitting at least one of a number of multicast sessions associated with the set of multicast sessions, a discontinuous reception configuration, or one or more radio network temporary identifiers associated with the set of multicast sessions.

In some examples of the method, apparatuses, and non-transitory computer-readable medium described herein, transmitting the one or more wake-up signal configurations may include operations, features, means, or instructions for transmitting the one or more wake-up signal configurations via RRC signaling, DCI, or a medium access control (MAC) control element (MAC-CE).

Some examples of the method, apparatuses, and non-transitory computer-readable medium described herein may further include operations, features, means, or instructions for transmitting DCI including the wake-up signal in a wake-up occasion associated with the first multicast session.

In some examples of the method, apparatuses, and non-transitory computer-readable medium described herein, the DCI may be for a group of UEs including the UE supported by a cell of the base station.

In some examples of the method, apparatuses, and non-transitory computer-readable medium described herein, the DCI may be scrambled with a wake-up multicast radio network temporary identifier specific to the first multicast session.

DETAILED DESCRIPTION

Figure 1:
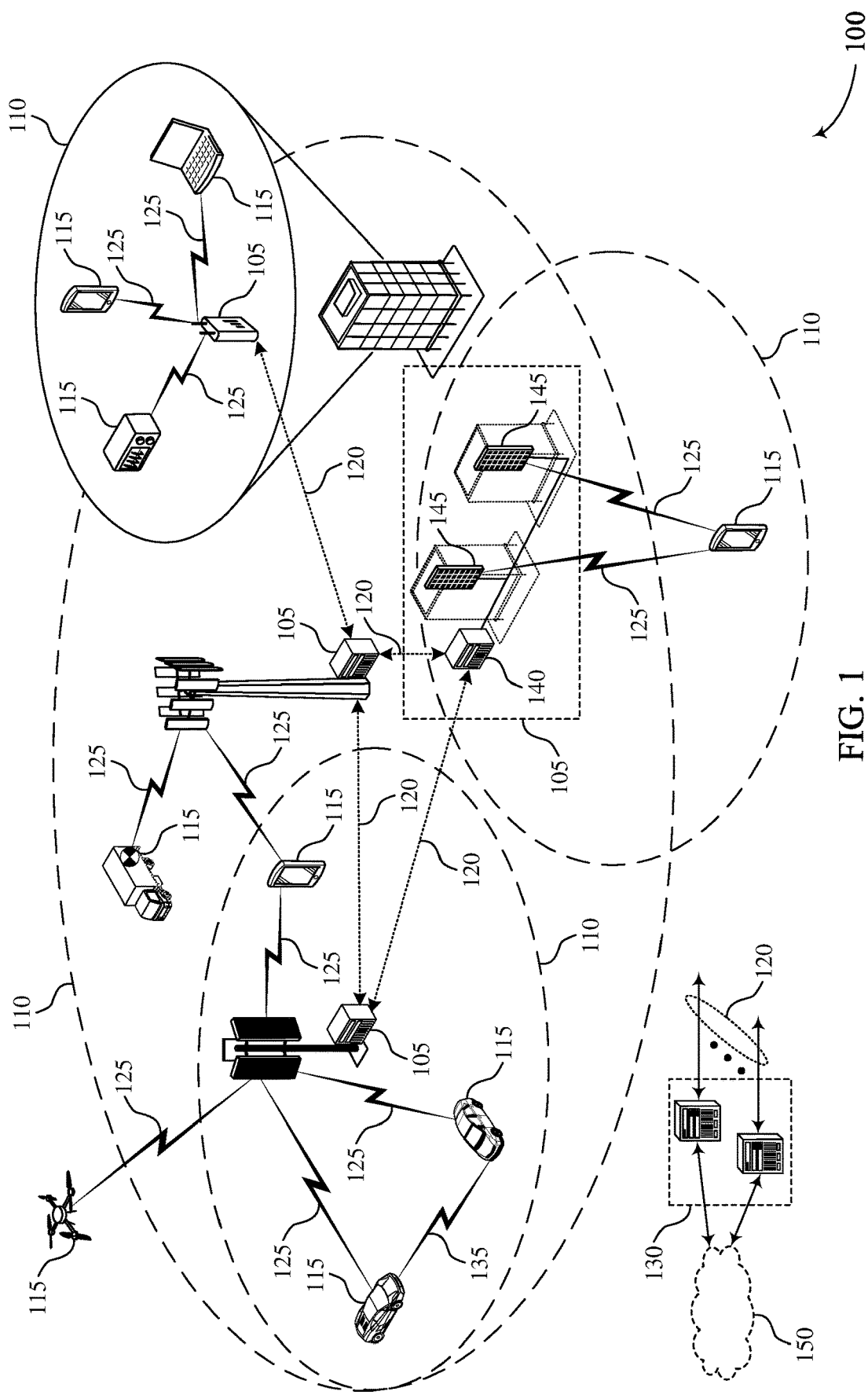
FIG. 1 illustrates an example of a wireless communications system that supports wake-up signal design for multiple multicast sessions in accordance with aspects of the present disclosure.

Some wireless communications systems may support multicast services (e.g., multimedia broadcast multicast service (MBMS)). A multicast service may include a point-to-multipoint communication scheme in which information is transmitted simultaneously from a single source (e.g., a base station) to multiple communication devices (e.g., multiple user equipments (UEs)). Additionally, a multicast service may refer to a distribution of information among a specific group of communication devices that are subscribed to the multicast service. In some cases, multicast services may utilize a discontinuous reception (DRX) scheme where a base station may transmit intermittently (e.g., during one or more time periods). In some cases, the time periods during which the base station transmits information may be referred to as active durations or on durations.

In some cases, a UE may support multiple multicast sessions where the UE receives information from a base station during multiple time periods (e.g., active durations) or via multiple channels. The UE may receive a wake-up signal prior to each active duration associated with each multicast sessions indicating the UE to monitor the multicast sessions. However, monitoring multiple multicast sessions for wake-up signals may cause the UE to monitor active durations during which the base station does not transmit information to the UE. Accordingly, the UE may use resources inefficiently by monitoring multiple multicast sessions, resulting in battery loss and increased power consumption.

Some techniques for providing a wake-up signal may include a base station transmitting configuration information to a UE indicating a wake-up signal configuration for one or more multicast sessions. Accordingly, the UE may monitor the one or more multicast sessions for a wake-up signal and receive, during a wake-up occasion prior to an active duration of a multicast session, a wake-up signal from the base station. The wake-up signal may include control signaling indicating to the UE which of the multicast sessions the UE is to monitor. For example, the UE may monitor a first multicast session for a wake-up signal based on the configuration information received from the base station. In some examples, the UE may select one or more multicast sessions to monitor based on a length of a DRX cycle associated with the one or more multicast sessions. Accordingly, the UE may receive a wake-up signal associated with the first multicast session and which includes an indication of a second multicast session the UE is to monitor. In some examples, the UE may receive the indication in a downlink control information (DCI) transmitted by the base station. In some examples, the indication may instruct the UE to monitor an active duration associated with the second multicast session. Additionally or alternatively, the indication may instruct the UE to monitor the second multicast session for a wake-up signal associated with the second multicast session. In some examples, the indication may include an indication that the UE is to not monitor one or more additional multicast sessions. The UE may determine whether to monitor one or more additional multicast sessions based on the indication received from the base station.

Particular aspects of the subject matter described herein may be implemented to realize one or more of the following potential advantages. The techniques employed by the described wireless communications systems may provide benefits and enhancements to the operation of the wireless communications system. For example, the described techniques may include features for improving power consumption by enabling UE to selectively monitor multicast sessions. The described techniques include additional features for improving resource use, power consumption, and battery life, among other benefits.

Aspects of the disclosure are initially described in the context of wireless communications systems. Aspects of the disclosure are further described in the context of a signal format, processing timelines, and a process flow. Aspects of the disclosure are further illustrated by and described with reference to apparatus diagrams, system diagrams, and flowcharts that relate to wake-up signal design for multiple multicast sessions.

FIG. 1 illustrates an example of a wireless communications system 100 that supports wake-up signal design for multiple multicast sessions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications system 100 may support multicast services (e.g., MBMS). A multicast service may include a point-to-multipoint or information distribution schemes between one or more base stations 105, one or more UEs 115, or a combination thereof. In some implementations, a multicast service may support a DRX scheme where a UE 115 is awake during one or more active durations associated with the multicast services to monitor for information from the base station 105. In some examples, a base station 105 may transmit a wake-up signal during a wake-up occasion prior to each active duration of a multicast service associated with the UE 115. In some examples, a UE 115 may support multiple multicast services or multiple sessions of a multicast service and may monitor each wake-up occasion in each multicast session for a wake-up signal transmitted by a base station 105.

To reduce the number of multicast sessions monitored by a UE 115, a base station 105 may transmit one or more wake-up signal configurations to the UE 115. In response, the UE 115 may monitor a wake-up occasion of a multicast session and receive the wake-up signal from the base station 105. The wake-up signal may include an indication of multicast sessions which the UE 115 is indicated to monitor. For example, the wake-up signal may indicate the UE 115 to monitor a wake-up occasion or an active duration associated with the first or a second multicast session of the UE 115. Additionally or alternatively, the wake-up signal may indicate the UE 115 to refrain from monitoring a given multicast session. The UE 115 may determine which multicast sessions to monitor based on the wake-up signal received from the base station 105. Accordingly, the UE 115 may selectively monitor multicast sessions, potentially reducing the number of multicast sessions the UE 115 monitors, which may decrease power consumption at the UE 115.

Figure 2:
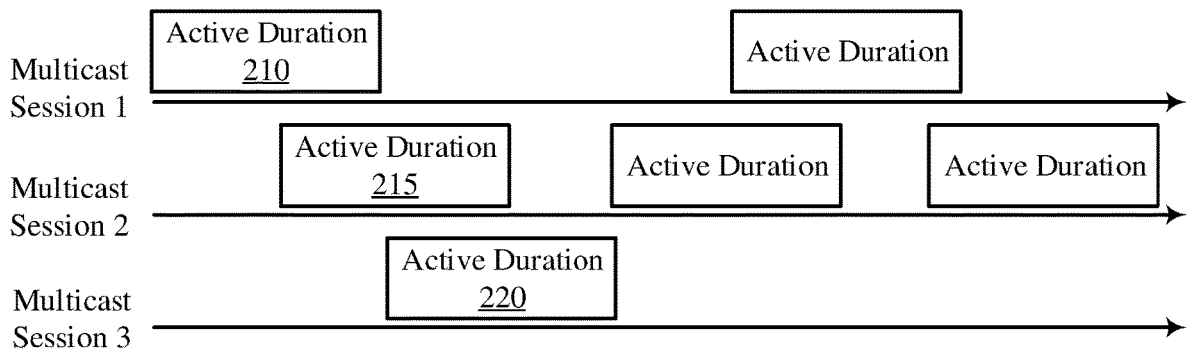
FIG. 2 illustrates an example of a wireless communications system that supports wake-up signal design for multiple multicast sessions in accordance with aspects of the present disclosure.
Figure 2:
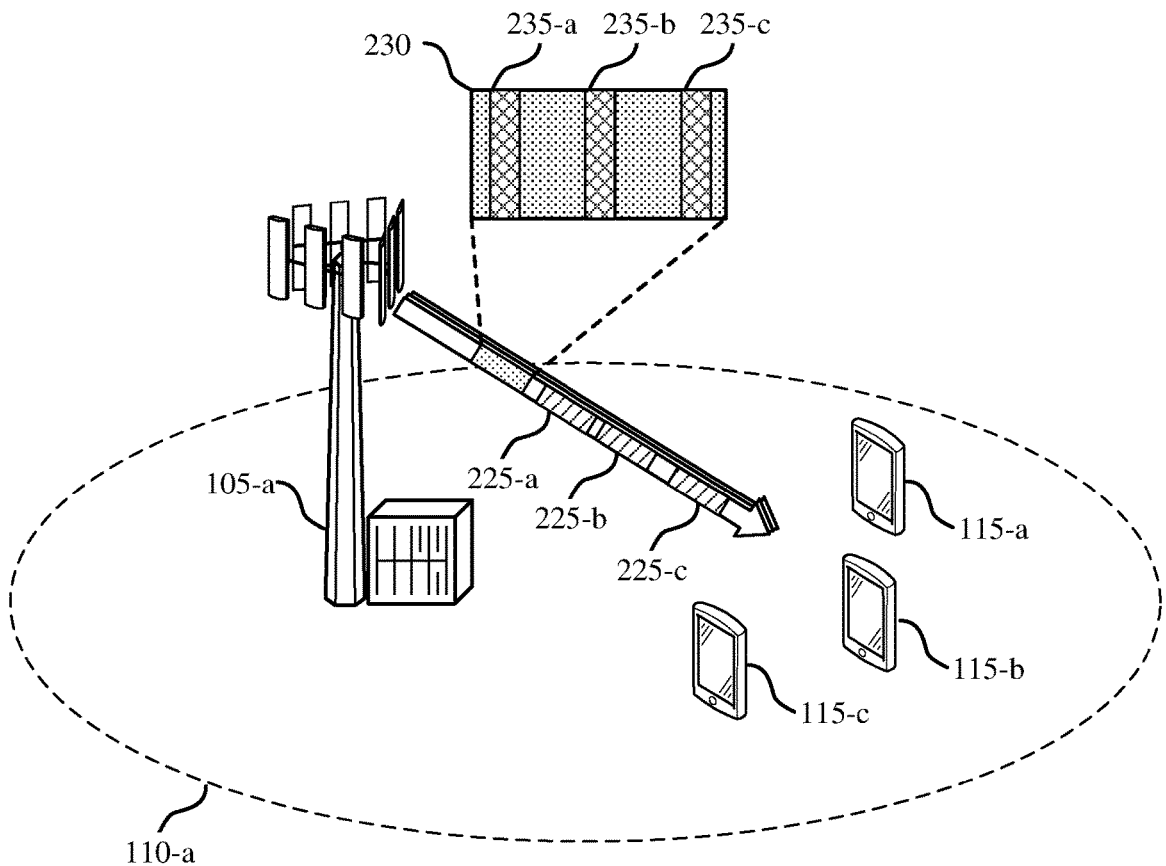

FIG. 2 illustrates an example of a wireless communications system 200 that supports wake-up signal design for multiple multicast sessions in accordance with one or more aspects of the present disclosure. In some examples, the wireless communications system 200 may implement one or more aspects of a wireless communications system 100. The wireless communications system 200 may include a UE 115-a, a UE 115-b, and a UE 115-c which may be examples of a UE 115 as described with reference to FIG. 1. The wireless communications system 200 may also include a base station 105-a which may be an example of a base station 105 as described with reference to FIG. 1. The base station 105-a may be associated with a cell which provides wireless communications service within coverage area 110.

The wireless communications system 200 may support multicast services (e.g., MBMS) which may include point-to-multipoint communications or information distribution schemes between a group of communication devices. For example, the base station 105-a may transmit information to the UEs 115-a, 115-b, or 115-c simultaneously. In some examples, a UE 115 may support multiple multicast services or sessions. Multicast services may utilize a DRX scheme where a UE 115 is awake during certain on or active durations configured for that UE 115 or for a given multicast session for multiple UEs 115, and the base station 105-a transmits information intermittently (e.g., during one or more time periods). For example, the base station 105-a may transmit a multicast message 225 to one or more of the UEs 115-a, 115-b, or 115-c during an active duration 210 of a first multicast session. Additionally or alternatively, the base station 105-a may transmit a multicast message 225 during an active duration 215 of a second multicast session or during an active duration 220 or a third multicast sessions. Similarly, the base station 105-a may transmit control signaling to one or more of the UEs 115-a, 115-b, or 115-c during one or more of the active durations, 210, 215, or 220. In some examples, the base station 105-a may transmit a wake-up signal prior to each active duration of a multicast sessions. For example, the base station 105-a may transmit a wake-up signal to one or more of the UEs 115-a, 115-b, or 115-c prior to the active duration 215 indicating the UEs 115 to monitor the active duration 215.

To reduce a number of multicast sessions monitored by a UE 115, the base station 105-a may transmit one or more wake-up signal configurations to one or more of the UEs 115-a, 115-b, or 115-c. For example, the base station 105-a may transmit an indication of one or more wake-up configurations indicating wake-up signal occasions to monitor prior to one or more of the active durations 210, 215, or 220. In some implementations, the one or more wake-up configurations may include a number of multicast sessions scrambled with a wake-up multicast radio network temporary identifier (RNTI), a DRX configuration including a DRX cycle and a time offset of respective active durations, wake-up multicast radio network temporary identifiers for each multicast sessions, or a combination thereof. In some implementations, the base station 105-a may transmit the indication in a DCI message, RRC signaling, or in a MAC-CE. In some examples, the UE 115-a may monitor a wake-up occasion prior to one or more of the active durations 210, 215, or 220. In some examples, the UE 115-a may monitor a wake-up occasion based on a length of a DRX cycle associated with the multicast session. For instance, the UE 115-a may select a multicast session associated with the longest DRX cycle and may choose to monitor the WUS occasions associated with the selected multicast session. Alternatively, the UE 115-a may select a multicast session associated with the shortest DRX cycle so as to be more accurately aware of control channel monitoring for each active duration corresponding to the multicast session. The UE 115-a may receive, during the wake-up occasion, a wake-up signal 230 indicating which multicast sessions to monitor. The wake-up signal 230 may include one or more indicators 235 indicating the UE 115-a to monitor active durations associated with one or more multicast sessions, to monitor additional wake-up signal occasions, or to refrain from monitoring one or more multicast sessions.

For example, the wake-up signal 230 may include an indicator 235-a indicating the UE 115-a to monitor the active duration 210 associated with the first multicast session, an indicator 235-b indicating the UE 115-a to monitor a wake-up signal occasion prior to the active duration 215 associated with the second multicast sessions, and an indicator 235-c indicating the UE 115-a to refrain from monitoring the active duration 220. In some implementations, the indicators 235 may be examples of a "wake-up indicator" parameter included in a DCI message, where a value of zero indicates the UE 115 to refrain from monitoring a multicast session, a value of one indicates a UE 115 to monitor an active duration (i.e., monitor for a transmission on a physical downlink control channel) associated with a multicast session, and a value of two indicates a UE 115 to monitor a wake-up occasion associated with a multicast session. The UE 115-a may determine which multicast sessions to monitor based on receiving the wake-up signal 230 from the base station 105-a. Implementing various aspects of the wireless communications system 200 may enable a UE 115 to selectively monitor multicast sessions, thereby improving power consumption and allowing for efficient use of processing resources.

Figure 3:
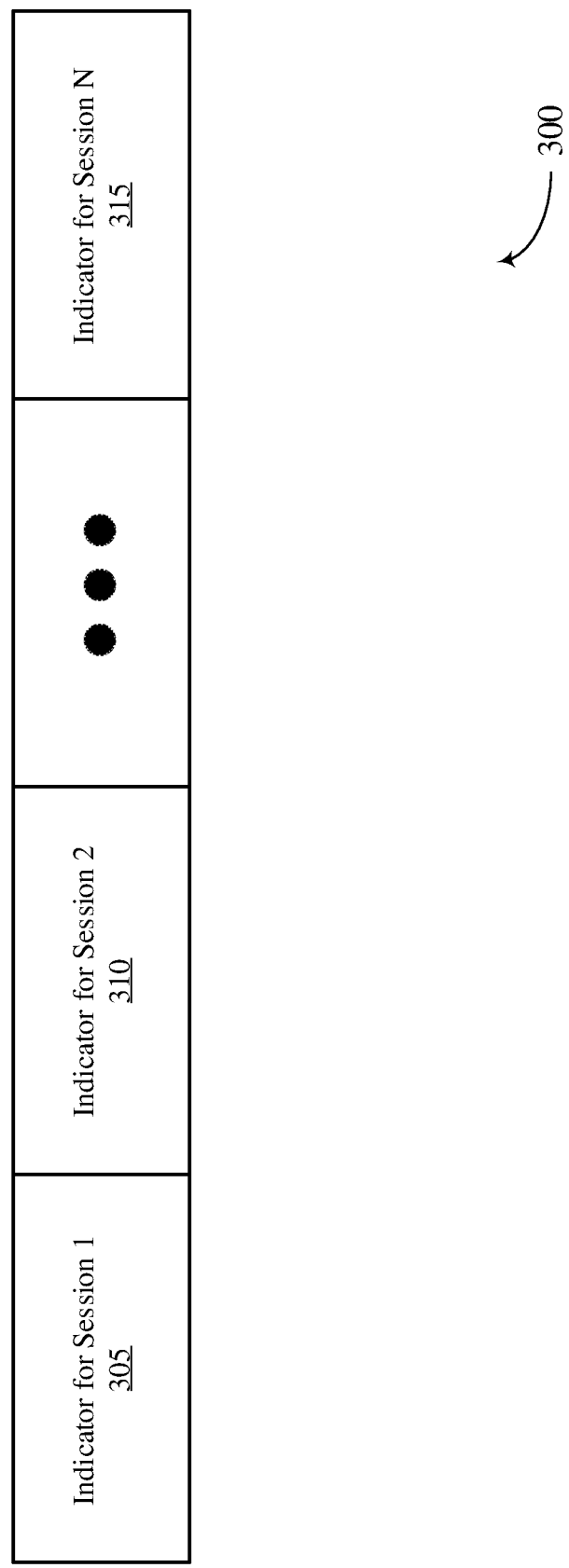
FIG. 3 illustrates an example of a signal format that supports wake-up signal design for multiple multicast sessions in accordance with aspects of the present disclosure.

FIG. 3 illustrates an example of a signal format 300 that supports wake-up signal design for multiple multicast sessions in accordance with one or more aspects of the present disclosure. In some examples, the signal format 300 may implement aspects of wireless communications systems 100 or 200. In some examples, the signal format 300 may be implemented by a base station 105, a UE 115 or any combination thereof, as described with reference to FIGS. 1 and 2. In some implementations, the signal format 300 may be implemented in a DCI message and may be representative of a wake-up signal as described herein. In some examples, a base station 105 may transmit control signaling using the signal format 300 to indicate to a UE 115 which of a set of multicast sessions to monitor. In some examples, the control signaling may include a wake-up signal associated with a multicast session. In some implementations, the base station 105 may transmit the wake-up signal in a DCI message.

For example, a base station 105 may transmit control signaling that includes an indicator 305 associated with a first multicast session. In some implementations the indicator 305 may have a value of zero, indicating a UE 115 to refrain from monitoring the first multicast session. In other implementations, the indicator 305 may have a value of one, indicating the UE 115 to monitor an active duration associated with the first multicast session. In other implementations, the indicator 305 may have a value of two, indicating the UE 115 to monitor a wake-up signal occasion associated the first multicast session where the wake-up signal occasion is before an active duration of the first multicast session. Similarly, the control signaling may include an indicator 310 associated with a second multicast session. The control signaling may include additional indicators associated with additional multicast sessions. For example, the control signaling may include an indicator 315 associated with a multicast session N. Each of indicators 305, 310, through 315 may have a value of zero, one, or two depending on whether the base station 105 requests the UE 115 to monitor a given wake-up occasion or active duration of a multicast session. Implementing one or more aspects of the signal format 300 may enable a base station 105 to indicate to a UE 115 to monitor one or more multicast sessions such that the UE 115 may selectively monitor multicast sessions, potentially reducing the number of sessions monitored by the UE 115.

Figure 4A:
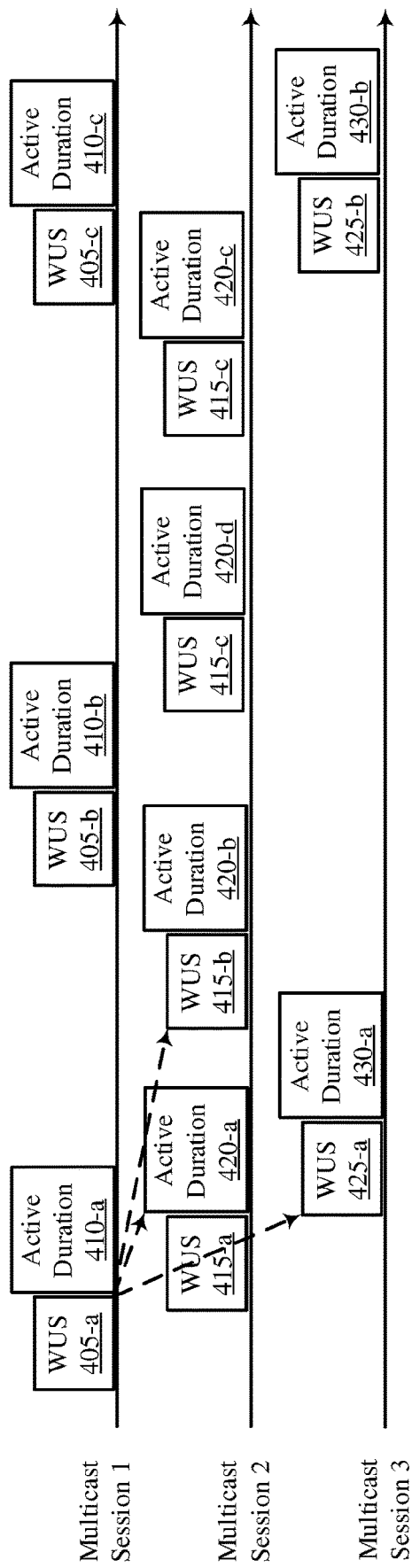
FIG. 4A-4B illustrate examples of processing timelines that support wake-up signal design for multiple multicast sessions in accordance with aspects of the present disclosure.
Figure 4B:
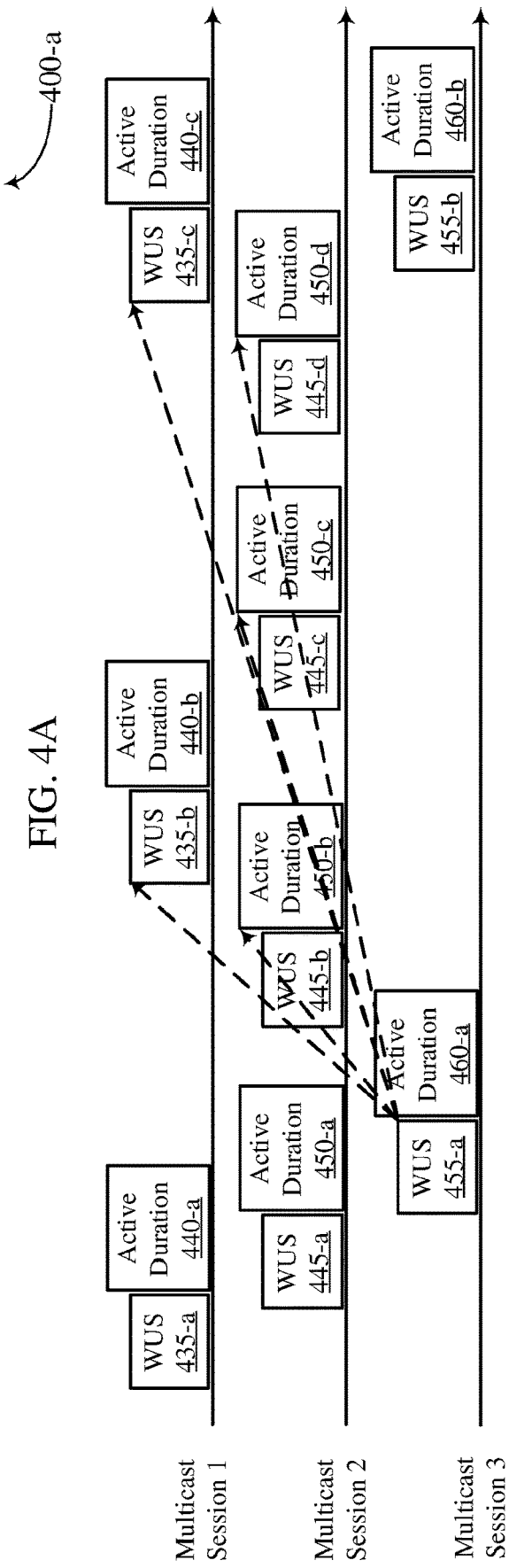

FIG. 4A-B illustrate example processing timelines 400-a and 400-b that support wake-up signal design for multiple multicast sessions in accordance with one or more aspects of the present disclosure. In some examples, the processing timelines 400-a and 400-b may implement aspects of wireless communications systems 100 or 200, a signal format 300, or any combination thereof. In some examples, the processing timelines 400-a and 400-b may be implemented by a base station 105, one or more UEs 115, or any combination thereof, as described with reference to FIGS. 1 and 2. In some examples, the processing timelines 400-a and 400-b may be examples of DRX configurations associated with one or more multicast sessions.

In one example, and with reference to FIG. 4A, a first multicast sessions may be configured with wake-up occasions 405-a, 405-b, and 405-c prior to active durations 410-a, 410-b, and 410-c, respectively. A second multicast session may be configured with wake-up occasions 415-a, 415-b, 415-c, and 415-d prior to active durations 420-a, 420-b, 420-c, and 420-d, respectively. A third multicast session may be configured with wake-up occasions 425-a and 425-b prior to active durations 430-a and 430-b, respectively. Accordingly, the first multicast session have a longer DRX cycle length (e.g., the length between active durations 410) than the second multicast session and a shorter DRX cycle length than the third multicast sessions. In some examples, the processing timeline 400-a may be indicated to a UE 115 by a base station 105-a via RRC signaling, a DCI message, or a MAC-CE, for example by one or more wake-up signal configurations.

In the example of FIG. 4A, UE 115 may monitor the wake-up occasion 405-a for a wake-up signal and may receive the wake-up signal from a base station 105-a. The wake-up signal may include an indication of additional multicast sessions the UE 115 is to monitor. For example, the wake-up signal may include indicators associated with the active duration 410-a associated with the first multicast sessions, the active durations 420-a and 420-b associated with the second multicast session, and the wake-up occasion associated with the third multicast session. In some examples, the wake-up signal received during the wake-up occasion 405-a may indicate the UE 115 to monitor the active durations 410-a and 420-a, to refrain from monitoring the active duration 420-b, and to monitor the wake-up occasion 425-a. In some implementations, the indicators may be examples of a "wake-up indicator" parameter included in a DCI message, where a value of zero indicates the UE 115 to refrain from monitoring a multicast session, a value of one indicates a UE 115 to monitor an active duration (i.e., monitor for a transmission on a physical downlink control channel) associated with a multicast session, and a value of two indicates a UE 115 to monitor a wake-up occasion associated with a multicast session.

In some cases, the wake-up signal in wake-up occasion 405-a may indicate information for each of multicast sessions 1, 2, and 3, and may indicate which of the multicast sessions the UE 115 is to monitor during the DRX cycle of multicast session 1. That is, the wake-up signal in wake-up occasion 405-a may indicate information for multicast sessions in which the UE is to monitor between active duration 410-a and active duration 410-b. If a UE 115 receives a wake-up signal in wake-up occasion 405-a indicating that the UE 115 is to monitor a multicast session (e.g., multicast session 2), the UE 115 may monitor each active duration of multicast session 2 that fall within the DRX cycle of multicast session 1 (e.g., the period between active duration 410-a and active duration 410-b). In some cases, the UE 115 refrain from monitoring wake-up occasion 415-c of multicast session 2 unless it receives another wake-up signal (e.g., in wake-up occasion 425-a or 405-b) indicating that the UE 115 is to monitor multicast session 2.

In another example, and with reference to FIG. 4B, a first multicast sessions may be configured with wake-up occasions 435-a, 435-b, and 435-c prior to active durations 440-a, 440-b, and 440-c, respectively. A second multicast session may be configured with wake-up occasions 445-a, 445-b, 445-c, and 445-d prior to active durations 450-a, 450-b, 450-c, and 450-d, respectively. A third multicast session may be configured with wake-up occasions 455-a and 455-b prior to active durations 460-a and 460-b, respectively. Accordingly, the first multicast session have a longer DRX cycle length than the second multicast session and a shorter DRX cycle length than the third multicast sessions. In some examples, the processing timeline 400-b may be indicated to a UE 115 by a base station 105-a via RRC signaling, a DCI message, or a MAC-CE.

In the example of FIG. 4B, a UE 115 may monitor a wake-up occasion 455-a for a wake-up signal and may receive the wake-up signal from a base station 105. The wake-up signal may include indicators associated with the first and second multicast sessions. For example, the wake-up signal may indicate a UE 115 to monitor the wake-up occasions 435-b and 435-c associated with the first multicast session. The wake-up signal may also indicate the UE 115 to monitor the active durations 450-b and 450-c associated with the second multicast session and the active duration 460-a associated with the third multicast session. The wake-up signal may also indicate the UE 115 to refrain from monitoring the active duration 450-d associated with the second multicast session.

In some implementations, the multicast sessions for which the wake-up signal includes indicators may be based on a DRX cycle length associated with the multicast session for the wake-up signal was received. For example, if a UE 115 receives a wake-up signal during the wake-up occasion 405-a, the wake-up signal may include indicators for all wake-up occasions or active durations occurring prior to the wake-up occasion 405-b. In some example, a UE 115 may select a multicast session for monitoring based on the length of the associated DRX cycle. For example, a UE 115 may determine to monitor the third multicast session based on the third multicast session having the longest DRX cycle. The length of a DRX cycle may impact power consumption or resource usage at a UE 115, as well as determine an amount of information the UE 115 receives from a base station 105 regarding additional multicast sessions. Implementing various aspects of the processing timelines 400-a and 400-b may allow a base station 105 to inform a UE 115 of additional multicast sessions via a wake-up signal transmitted on one multicast session. Accordingly, a UE 115 may monitor fewer wake-up occasions, leading to a decreased power consumption at the UE 115.

Figure 5:
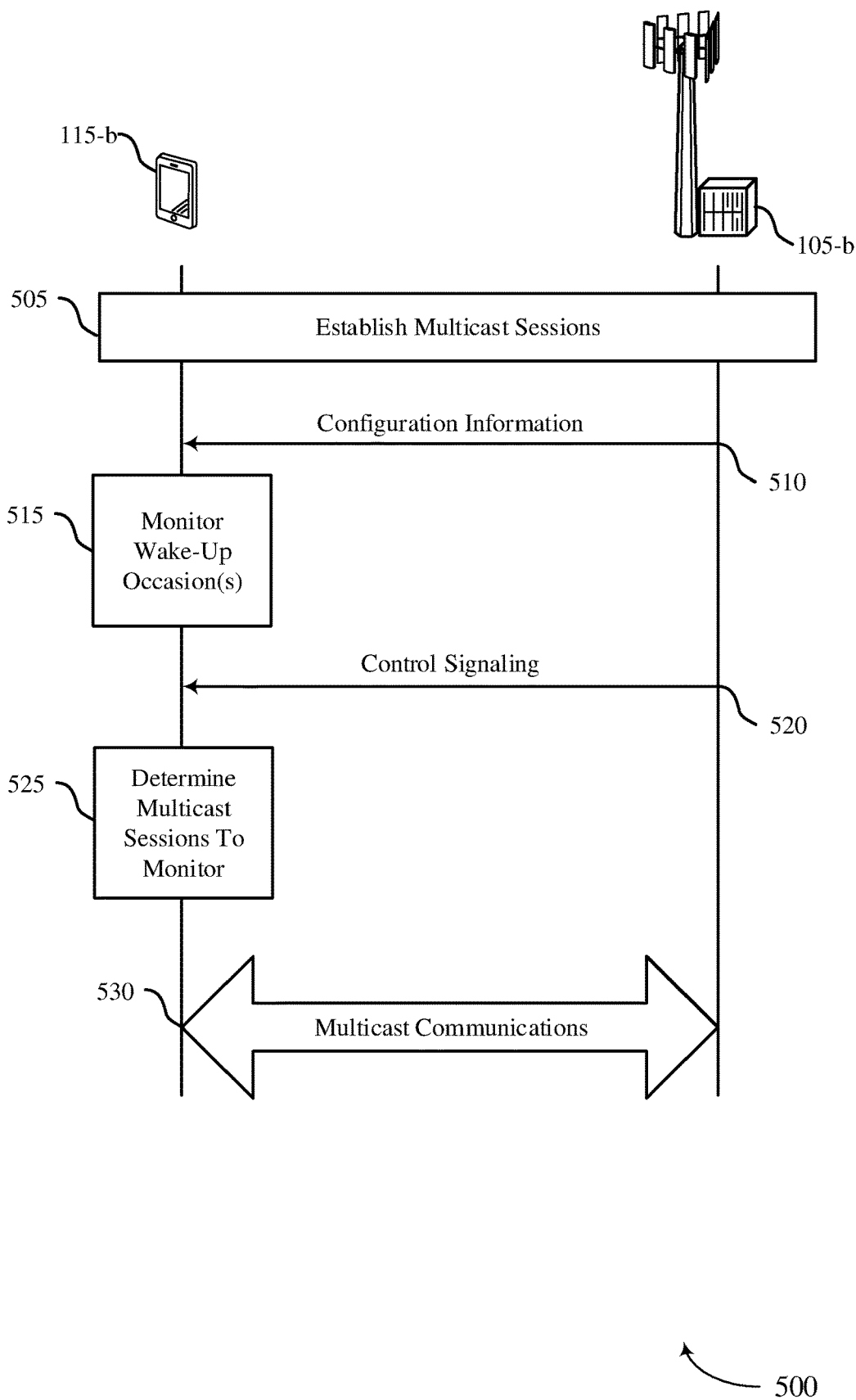
FIG. 5 illustrates an example of a process flow that supports wake-up signal design for multiple multicast sessions in accordance with aspects of the present disclosure.

FIG. 5 illustrates an example of a process flow 500 that supports wake-up signal design for multiple multicast sessions in accordance with one or more aspects of the present disclosure. In some examples, the process for 500 may implement one or more aspects of wireless communications systems 100 or 200, a signal format 300, a processing timeline 400-a or 400-b, or any combination thereof. The process flow 500 may include a UE 115-b and a base station 105-b which may be examples of the corresponding devices described herein. Alternative examples of the following may be implemented where some processes are performed in a different order than described or not performed at all. In some implementations, processes may include additional features not mentioned below, or further processes may be added.

At 505, the UE 115-b and the base station 105-b may establish one or more multicast sessions. In some examples, establishing the multicast sessions may include transmitting configuration information to the UE 115-b, including a DRX profile.

At 510, the base station 105-b may transmit one or more wake-up signal configurations to the UE 115-b. In some examples, the wake-up signal configurations may include a number of multicast sessions included in the wake-up signal scrambled with a wake-up multicast radio network temporary identifier, a DRX configuration including a offset of a wake-up signal relative to active durations associated with one or more multicast sessions, or respective wake-up multicast radio network temporary identifiers for each of the one or more multicast sessions. In some implementations, the base station 105-b may transmit the wake-up signal configurations via RRC signaling, in a DCI message, or in a MAC-CE.

At 515, the UE 115-b may monitor a wake-up occasion prior to an active duration associated with a multicast session. In some examples, the UE 115-b may select a wake-up occasion to monitor based on a length of a DRX cycle of the associated multicast session.

At 520, the base station 105-b may transmit control signaling including a wake-up signal during a wake-up occasion prior to an active duration associated with a multicast session. The control signaling may include an indication of additional multicast sessions for the UE 115-b to monitor. For example, the control signaling may include an indication that the UE 115-b is to monitor an active duration associated with a first multicast session, to monitor a wake-up occasion associated with a second multicast sessions, and to refrain from monitoring an active duration associated with a third multicast session. In some implementations, the base station 105-b may transmit the control signaling via a DCI message.

At 525, the UE 115-b may determine which of a set of multicast sessions to monitor based on the control signaling received from the base station 105-b.

At 530, the UE 115-b and the base station 105-b may perform multicast communications based on the control signaling transmitted by the base station 105-b. For example, the base station 105-b may transmit a multicast message (e.g., on a physical downlink control channel) during an active duration which the UE 115-b is indicated to monitor. Implementing various aspects of the process flow 500 may allow a UE 115-b to selectively monitor multicast sessions, leading to a decreased power consumption.

Figure 6:
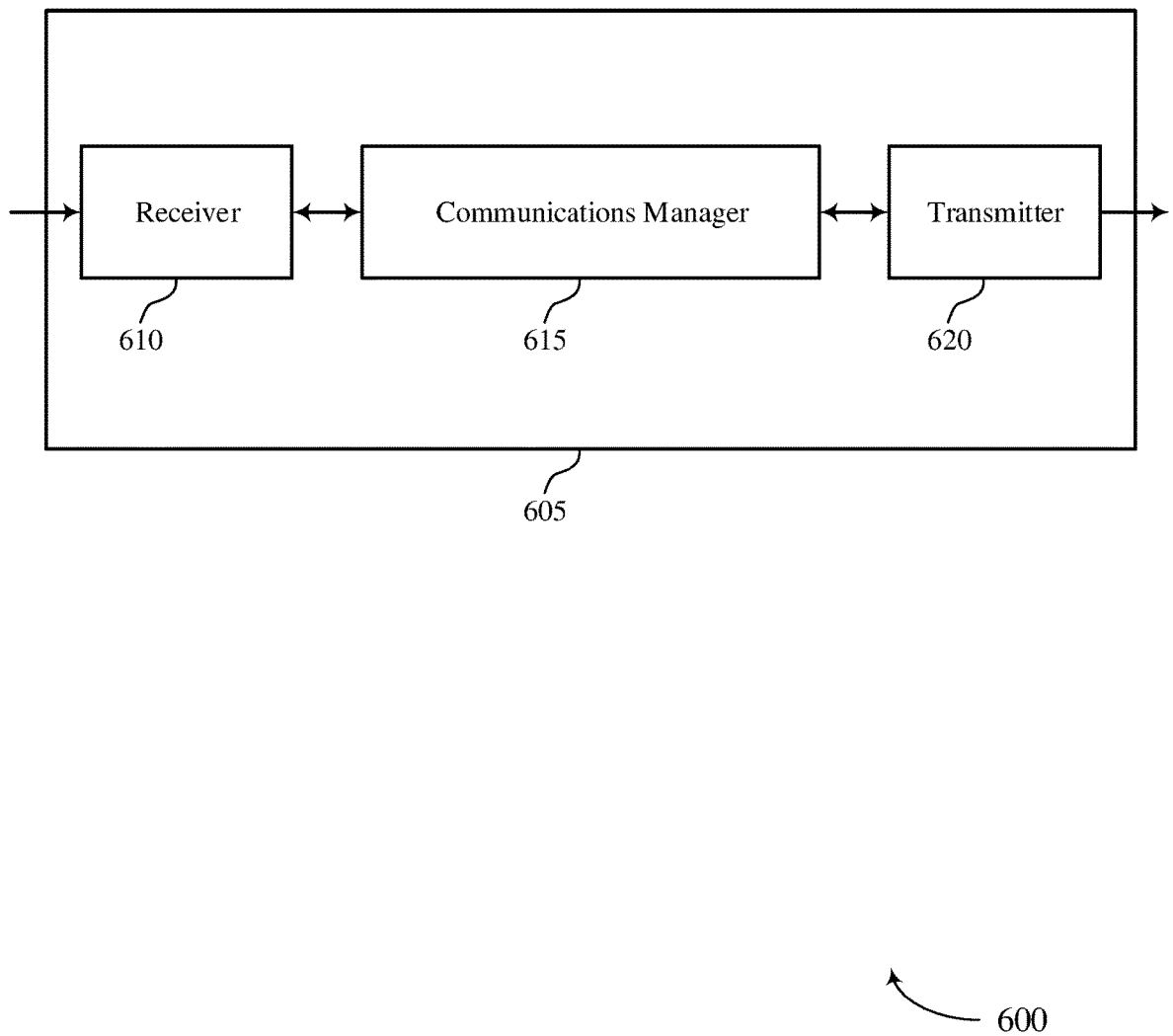
FIGS. 6 and 7 show block diagrams of devices that support wake-up signal design for multiple multicast sessions in accordance with aspects of the present disclosure.

FIG. 6 shows a block diagram 600 of a device 605 that supports wake-up signal design for multiple multicast sessions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to wake-up signal design for multiple multicast sessions, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a configuration indicating one or more wake-up signal configurations associated with a set of multicast sessions configured for the UE, monitor, during a wake-up occasion of a first multicast session of the set of multicast sessions and before an active duration of the first multicast session, for a wake-up signal based on the one or more wake-up signal configurations, receive the wake-up signal based on the monitoring, the wake-up signal including an indication of which of the set of multicast sessions the UE is to monitor, and determine whether to monitor one or more of the set of multicast sessions based on the indication of which of the set of multicast sessions the UE is to monitor. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and a receiver 610 and transmitter 620 may be implemented as analog components (e.g., amplifiers, filters, antennas) coupled with the mobile device modem to enable wireless transmission and reception over one or more bands.

The communications manager 615 as described may be implemented to realize one or more potential advantages. One implementation may allow the device 605 to receive a wake-up signal including indications of additional multicast sessions to monitor. Based on the techniques for receiving a wake-up signal, the device 605 may support selectively monitoring multicast sessions.

As such, the device 605 may reduce the number of multicast sessions that the device 605 monitors and, accordingly, may exhibit a decreased power consumption and increased battery life. In some examples, the device 605 may experience improved reliability and reduced resource usage, among other benefits.

Figure 7:
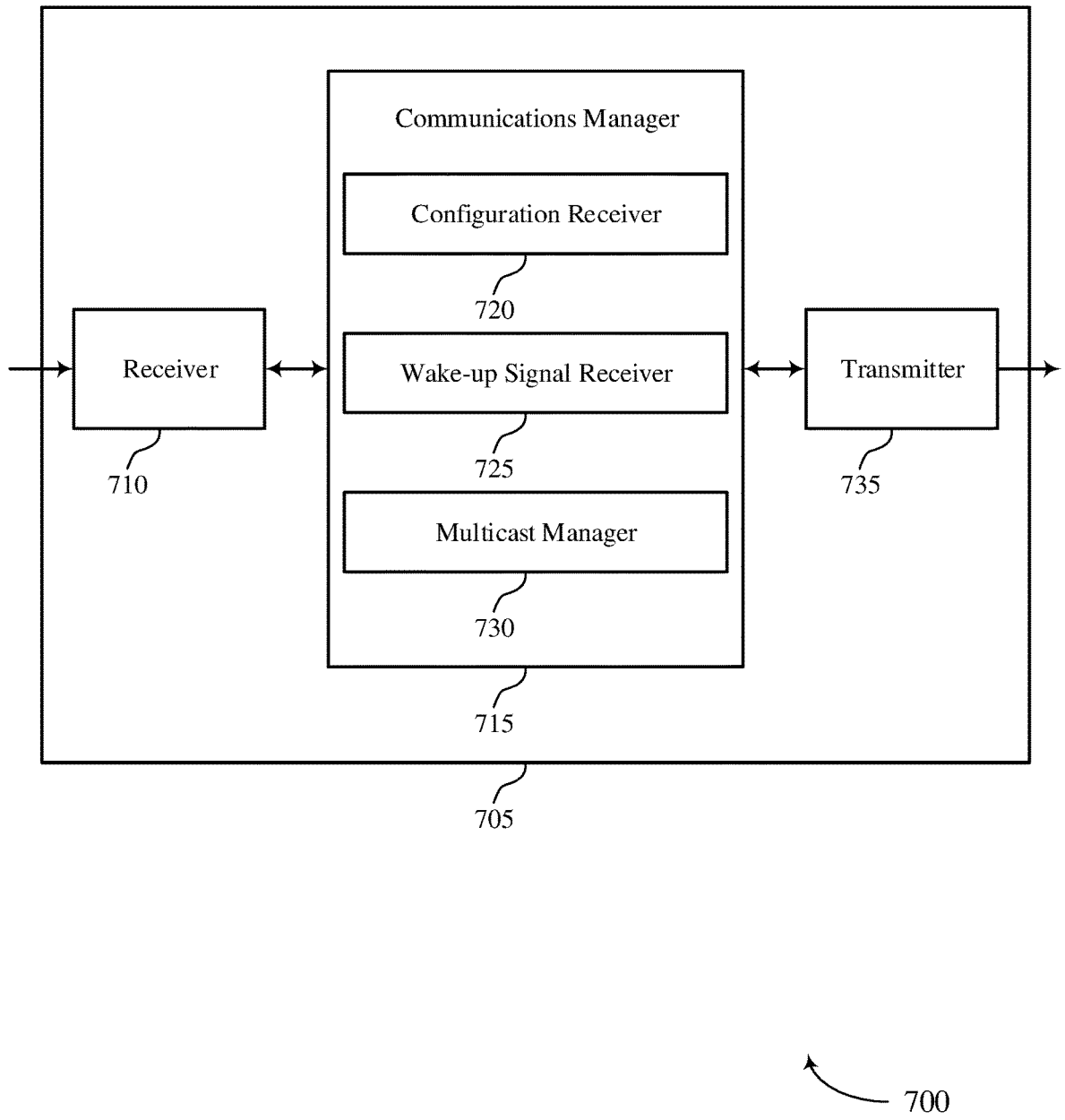

FIG. 7 shows a block diagram 700 of a device 705 that supports wake-up signal design for multiple multicast sessions in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to wake-up signal design for multiple multicast sessions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration receiver 720, a wake-up signal receiver 725, and a multicast manager 730. The communications manager 715 may be an example of aspects of the communications manager 910 described herein.

The configuration receiver 720 may receive, from a base station, a configuration indicating one or more wake-up signal configurations associated with a set of multicast sessions configured for the UE.

The wake-up signal receiver 725 may monitor, during a wake-up occasion of a first multicast session of the set of multicast sessions and before an active duration of the first multicast session, for a wake-up signal based on the one or more wake-up signal configurations and receive the wake-up signal based on the monitoring, the wake-up signal including an indication of which of the set of multicast sessions the UE is to monitor.

The multicast manager 730 may determine whether to monitor one or more of the set of multicast sessions based on the indication of which of the set of multicast sessions the UE is to monitor.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
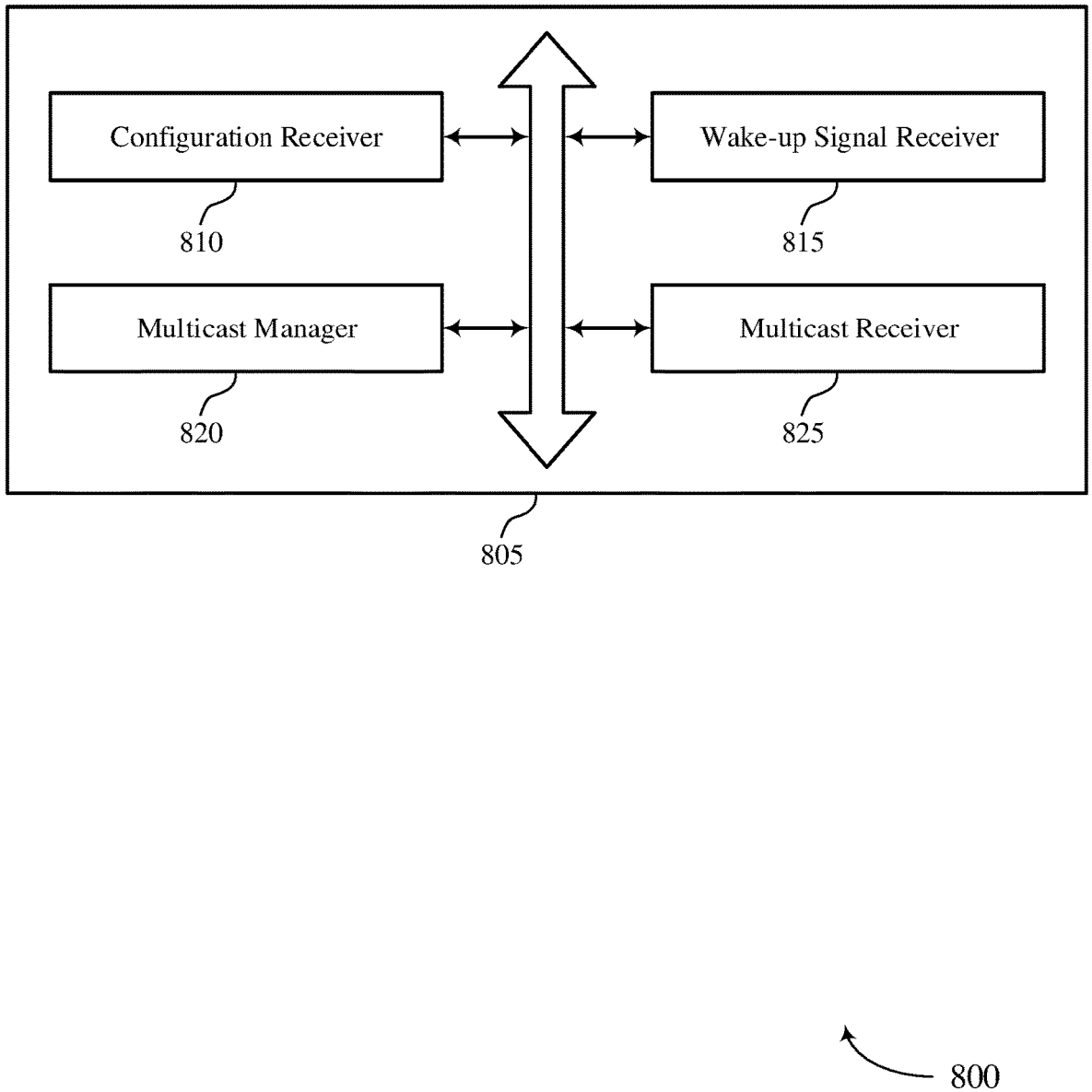
FIG. 8 shows a block diagram of a communications manager that supports wake-up signal design for multiple multicast sessions in accordance with aspects of the present disclosure.

FIG. 8 shows a block diagram 800 of a communications manager 805 that supports wake-up signal design for multiple multicast sessions in accordance with aspects of the present disclosure. The communications manager 805 may be an example of aspects of a communications manager 615, a communications manager 715, or a communications manager 910 described herein. The communications manager 805 may include a configuration receiver 810, a wake-up signal receiver 815, a multicast manager 820, and a multicast receiver 825. Each of these modules may communicate, directly or indirectly, with one another (e.g., via one or more buses).

The configuration receiver 810 may receive, from a base station, a configuration indicating one or more wake-up signal configurations associated with a set of multicast sessions configured for the UE.

In some examples, the configuration receiver 810 may receive a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

In some examples, the configuration receiver 810 may receive at least one of a number of multicast sessions associated with the set of multicast sessions, a discontinuous reception configuration, or one or more radio network temporary identifiers associated with the set of multicast sessions.

In some examples, the configuration receiver 810 may receive the one or more wake-up signal configurations via RRC signaling, DCI, or a medium access control (MAC) control element (MAC-CE). In some examples, the configuration receiver 810 may receive a downlink control message from the base station indicating respective wake-up multicast radio network temporary identifiers for each of the set of multicast sessions configured for the UE.

The wake-up signal receiver 815 may monitor, during a wake-up occasion of a first multicast session of the set of multicast sessions and before an active duration of the first multicast session, for a wake-up signal based on the one or more wake-up signal configurations.

In some examples, the wake-up signal receiver 815 may receive the wake-up signal based on the monitoring, the wake-up signal including an indication of which of the set of multicast sessions the UE is to monitor.

In some examples, the wake-up signal receiver 815 may receive a set of indicators corresponding to the set of multicast sessions in the wake-up signal, where each of the set of indicators corresponds to a respective multicast session of the set of multicast sessions.

In some examples, the wake-up signal receiver 815 may monitor for a second wake-up signal or a second downlink control channel associated with the second multicast session based on determining to monitor the second multicast session.

In some examples, the wake-up signal receiver 815 may receive DCI that includes the wake-up signal, the DCI associated with a wake-up multicast radio network temporary identifier common to all UEs in a cell supported by the base station.

In some examples, the wake-up signal receiver 815 may receive the wake-up signal before the active duration of a discontinuous reception cycle associated with the first multicast session.

In some cases, the downlink control message is received via RRC signaling, DCI, or a medium access control (MAC) control element (MAC-CE).

The multicast manager 820 may determine whether to monitor one or more of the set of multicast sessions based on the indication of which of the set of multicast sessions the UE is to monitor.

In some examples, the multicast manager 820 may determine which of the set of multicast sessions to the UE is to monitor based on the set of indicators.

In some examples, the multicast manager 820 may determine to refrain from monitoring for a downlink control channel during a second active duration associated with a second multicast session based on the indication including a wake-up indicator having a value indicating that the UE is to refrain from monitoring for the downlink control channel of the second multicast session.

In some examples, the multicast manager 820 may determine to monitor for a downlink control channel during a second active duration associated with a second multicast session based on the indication including a wake-up indicator having a value indicating that the UE is to monitor for the downlink control channel of the second multicast session.

In some examples, the multicast manager 820 may determine to monitor for a second wake-up signal before a second active duration associated with a second multicast session based on the indication including a wake-up indicator having a value indicating that the UE is to monitor for the second wake-up signal of the second multicast session.

In some examples, the multicast manager 820 may determine to monitor for a downlink control channel during the active duration of the first multicast session based on the indication including a first wake-up indicator having a first value indicating that the UE is to monitor for the downlink control channel of the first multicast session.

In some examples, the multicast manager 820 may determine to monitor a second multicast session of the set of multicast sessions based on the indication including a second wake-up indicator having a second value indicating that the UE is to monitor for the second multicast session.

In some examples, the multicast manager 820 may refrain from monitoring the one or more of the set of multicast sessions during a wake-up cycle of the first multicast session based on the indication.

In some examples, the multicast manager 820 may select the first multicast session of the set of multicast sessions for monitoring by the UE based on a length of a discontinuous reception cycle associated with the first multicast session.

In some cases, the length of the discontinuous reception cycle corresponding to a longest length or shortest length of all multicast sessions of the set of multicast sessions.

The multicast receiver 825 may monitor the one or more of the set of multicast sessions based on determining which of the set of multicast sessions to the UE is to monitor.

In some examples, the multicast receiver 825 may monitor all active durations associated with the at least one multicast session during a wake-up cycle of the first multicast session based on the indication.

Figure 9:
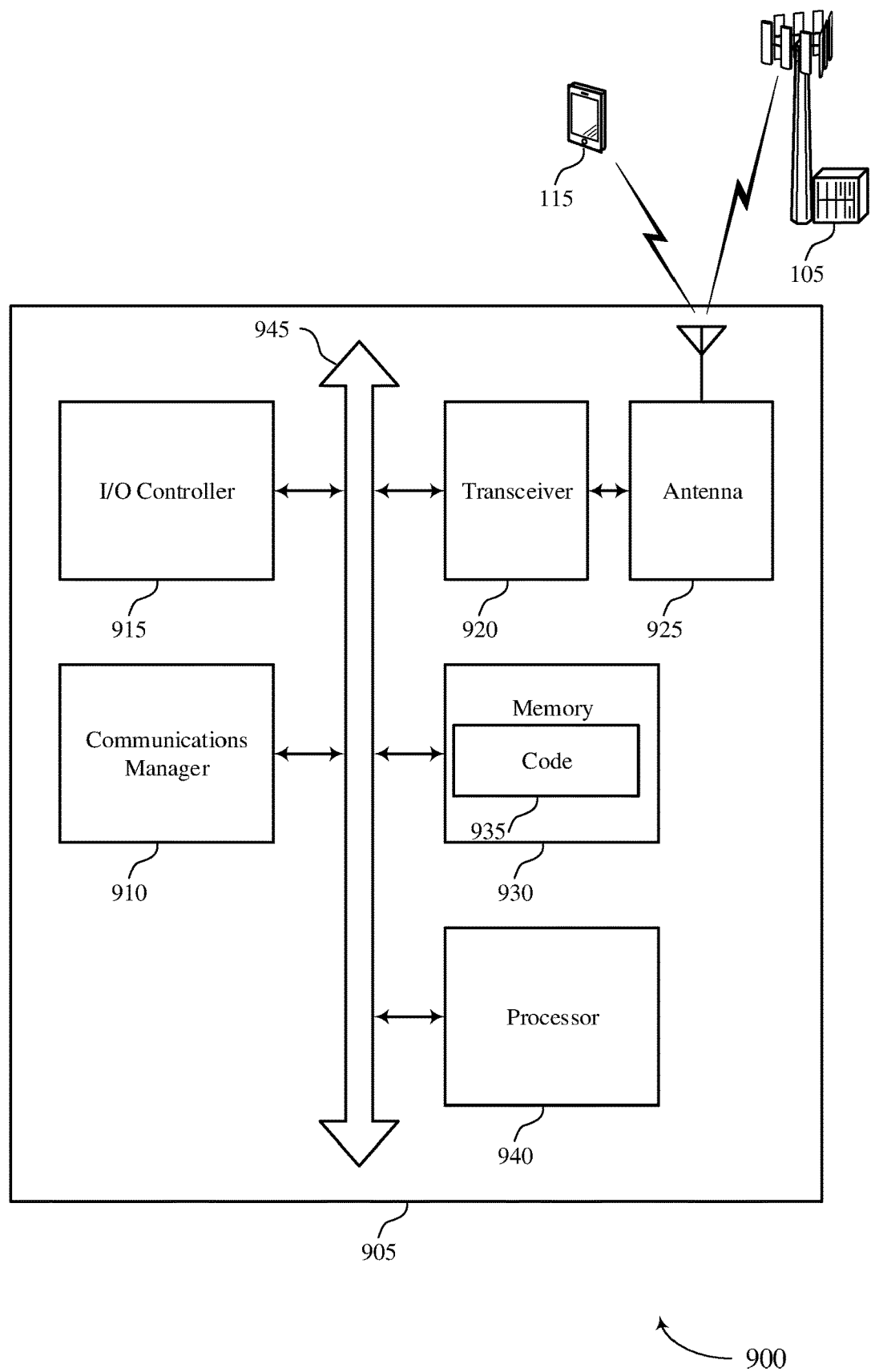
FIG. 9 shows a diagram of a system including a device that supports wake-up signal design for multiple multicast sessions in accordance with aspects of the present disclosure.

FIG. 9 shows a diagram of a system 900 including a device 905 that supports wake-up signal design for multiple multicast sessions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a configuration indicating one or more wake-up signal configurations associated with a set of multicast sessions configured for the UE, monitor, during a wake-up occasion of a first multicast session of the set of multicast sessions and before an active duration of the first multicast session, for a wake-up signal based on the one or more wake-up signal configurations, receive the wake-up signal based on the monitoring, the wake-up signal including an indication of which of the set of multicast sessions the UE is to monitor, and determine whether to monitor one or more of the set of multicast sessions based on the indication of which of the set of multicast sessions the UE is to monitor.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting wake-up signal design for multiple multicast sessions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
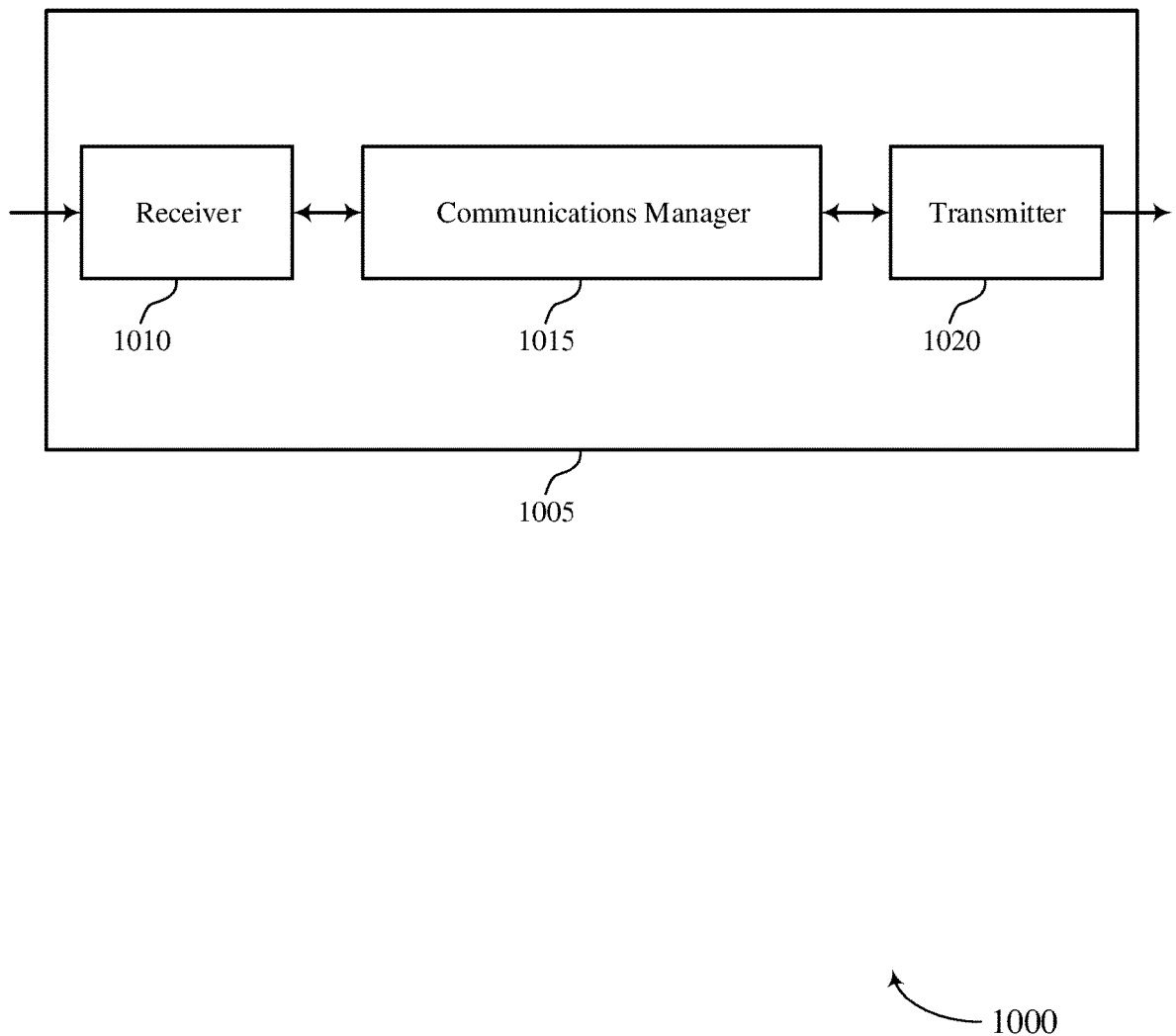
FIGS. 10 and 11 show block diagrams of devices that support wake-up signal design for multiple multicast sessions in accordance with aspects of the present disclosure.

FIG. 10 shows a block diagram 1000 of a device 1005 that supports wake-up signal design for multiple multicast sessions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to wake-up signal design for multiple multicast sessions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a set of multicast sessions configured for a UE, determine which of the set of multicast sessions the UE is to monitor during a wake-up cycle associated with a first multicast session of the set of multicast sessions, transmit one or more wake-up signal configurations for the set of multicast sessions to the UE, the one or more wake-up signal configurations indicating respective identifiers for each of the set of multicast sessions, and transmit a wake-up signal before an active duration of the first multicast session, the wake-up signal indicating which of the set of multicast sessions the UE is to monitor during the wake-up cycle associated with the first multicast session of the set of multicast sessions based on the determining. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
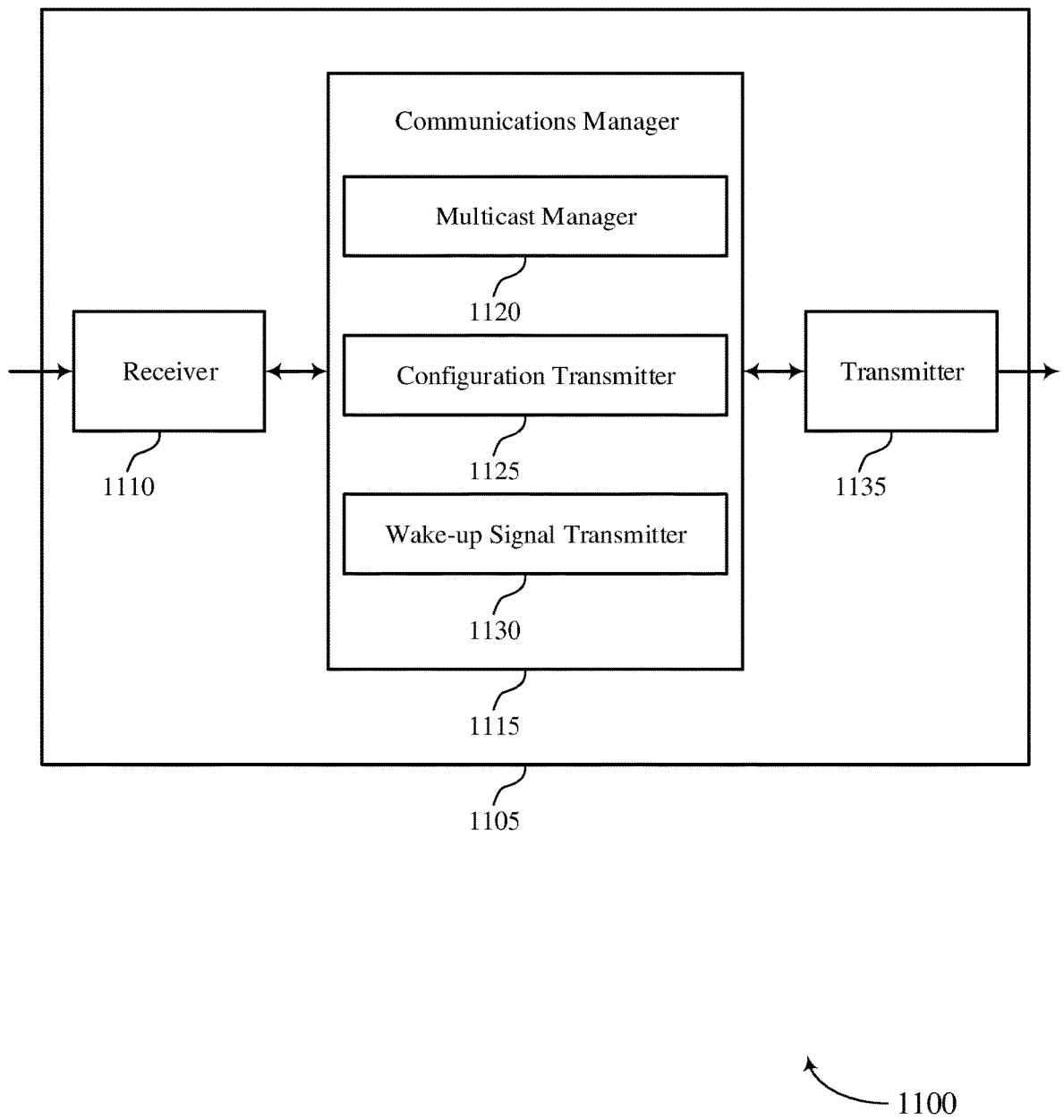

FIG. 11 shows a block diagram 1100 of a device 1105 that supports wake-up signal design for multiple multicast sessions in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to wake-up signal design for multiple multicast sessions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a multicast manager 1120, a configuration transmitter 1125, and a wake-up signal transmitter 1130. The communications manager 1115 may be an example of aspects of the communications manager 1310 described herein.

The multicast manager 1120 may identify a set of multicast sessions configured for a UE and determine which of the set of multicast sessions the UE is to monitor during a wake-up cycle associated with a first multicast session of the set of multicast sessions.

The configuration transmitter 1125 may transmit one or more wake-up signal configurations for the set of multicast sessions to the UE, the one or more wake-up signal configurations indicating respective identifiers for each of the set of multicast sessions.

The wake-up signal transmitter 1130 may transmit a wake-up signal before an active duration of the first multicast session, the wake-up signal indicating which of the set of multicast sessions the UE is to monitor during the wake-up cycle associated with the first multicast session of the set of multicast sessions based on the determining.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
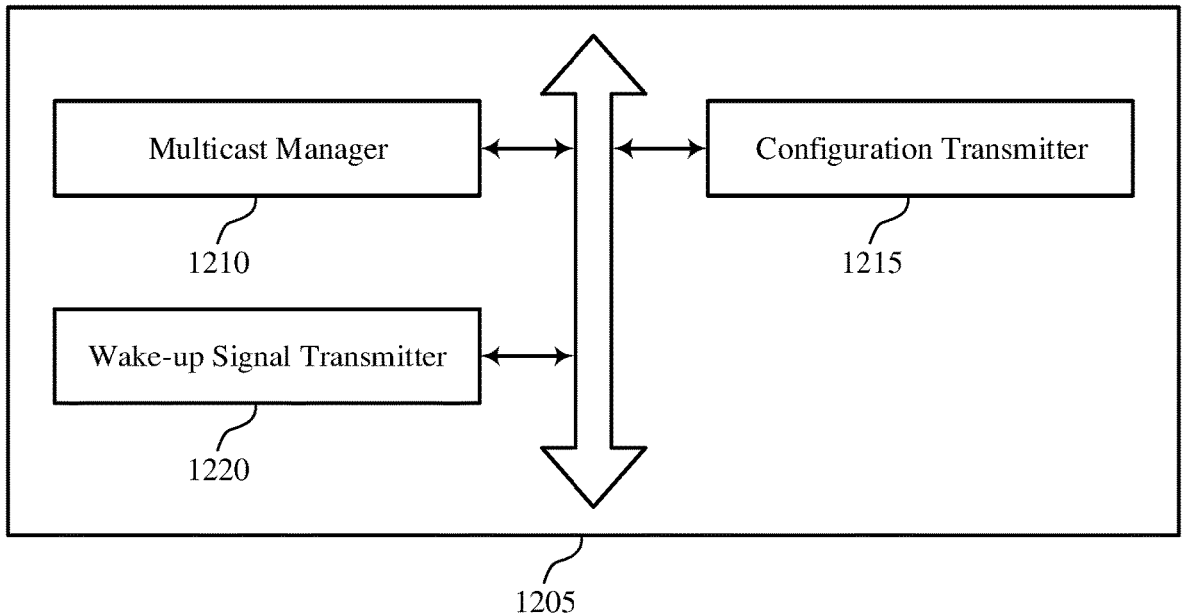
FIG. 12 shows a block diagram of a communications manager that supports wake-up signal design for multiple multicast sessions in accordance with aspects of the present disclosure.

FIG. 12 shows a block diagram 1200 of a communications manager 1205 that supports wake-up signal design for multiple multicast sessions in accordance with aspects of the present disclosure. The communications manager 1205 may be an example of aspects of a communications manager 1015, a communications manager 1115, or a communications manager 1310 described herein. The communications manager 1205 may include a multicast manager 1210, a configuration transmitter 1215, and a wake-up signal transmitter 1220. Each of these modules may communicate, directly or indirectly, with one another (e.g., via one or more buses).

The multicast manager 1210 may identify a set of multicast sessions configured for a UE.

In some examples, the multicast manager 1210 may determine which of the set of multicast sessions the UE is to monitor during a wake-up cycle associated with a first multicast session of the set of multicast sessions.

In some examples, determining that the UE is to refrain from monitoring for a downlink control channel during a second active duration associated with a second multicast session, where the wake-up signal includes a wake-up indicator having a value indicating that the UE is to refrain from monitoring for the downlink control channel of the second multicast session.

In some examples, determining that the UE is to monitor for a downlink control channel during a second active duration associated with a second multicast session, where the wake-up signal includes a wake-up indicator having a value indicating that the UE is to monitor for the downlink control channel of the second multicast session.

In some examples, determining that the UE is to monitor for a second wake-up signal before a second active duration associated with a second multicast session, where the wake-up signal includes a wake-up indicator having a value indicating that the UE is to monitor for the second wake-up signal of the second multicast session.

In some examples, determining that the UE is to monitor for a downlink control channel during the active duration of the first multicast session, where the wake-up signal includes a first wake-up indicator having a first value indicating that the UE is to monitor for the downlink control channel of the first multicast session.

In some examples, determining that the UE is to monitor a second multicast session, where the wake-up signal includes a second wake-up indicator having a second value indicating that the UE is to monitor the second multicast session.

The configuration transmitter 1215 may transmit one or more wake-up signal configurations for the set of multicast sessions to the UE, the one or more wake-up signal configurations indicating respective identifiers for each of the set of multicast sessions.

In some examples, the configuration transmitter 1215 may transmit a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

In some examples, the configuration transmitter 1215 may transmit at least one of a number of multicast sessions associated with the set of multicast sessions, a discontinuous reception configuration, or one or more radio network temporary identifiers associated with the set of multicast sessions.

In some examples, the configuration transmitter 1215 may transmit the one or more wake-up signal configurations via RRC signaling, DCI, or a medium access control (MAC) control element (MAC-CE).

The wake-up signal transmitter 1220 may transmit a wake-up signal before an active duration of the first multicast session, the wake-up signal indicating which of the set of multicast sessions the UE is to monitor during the wake-up cycle associated with the first multicast session of the set of multicast sessions based on the determining.

In some examples, the wake-up signal transmitter 1220 may transmit a set of indicators corresponding to the set of multicast sessions in the wake-up signal, the set of indicators indicating which of the set of multicast sessions the UE is to monitor, where each of the set of indicators corresponds to a respective multicast session of the set of multicast sessions, and where each indicator instructs the UE whether to monitor the respective multicast session.

In some examples, the wake-up signal transmitter 1220 may transmit DCI including the wake-up signal in a wake-up occasion associated with the first multicast session.

In some cases, the DCI is for a group of UEs including the UE supported by a cell of the base station.

In some cases, the DCI is scrambled with a wake-up multicast radio network temporary identifier specific to the first multicast session.

Figure 13:
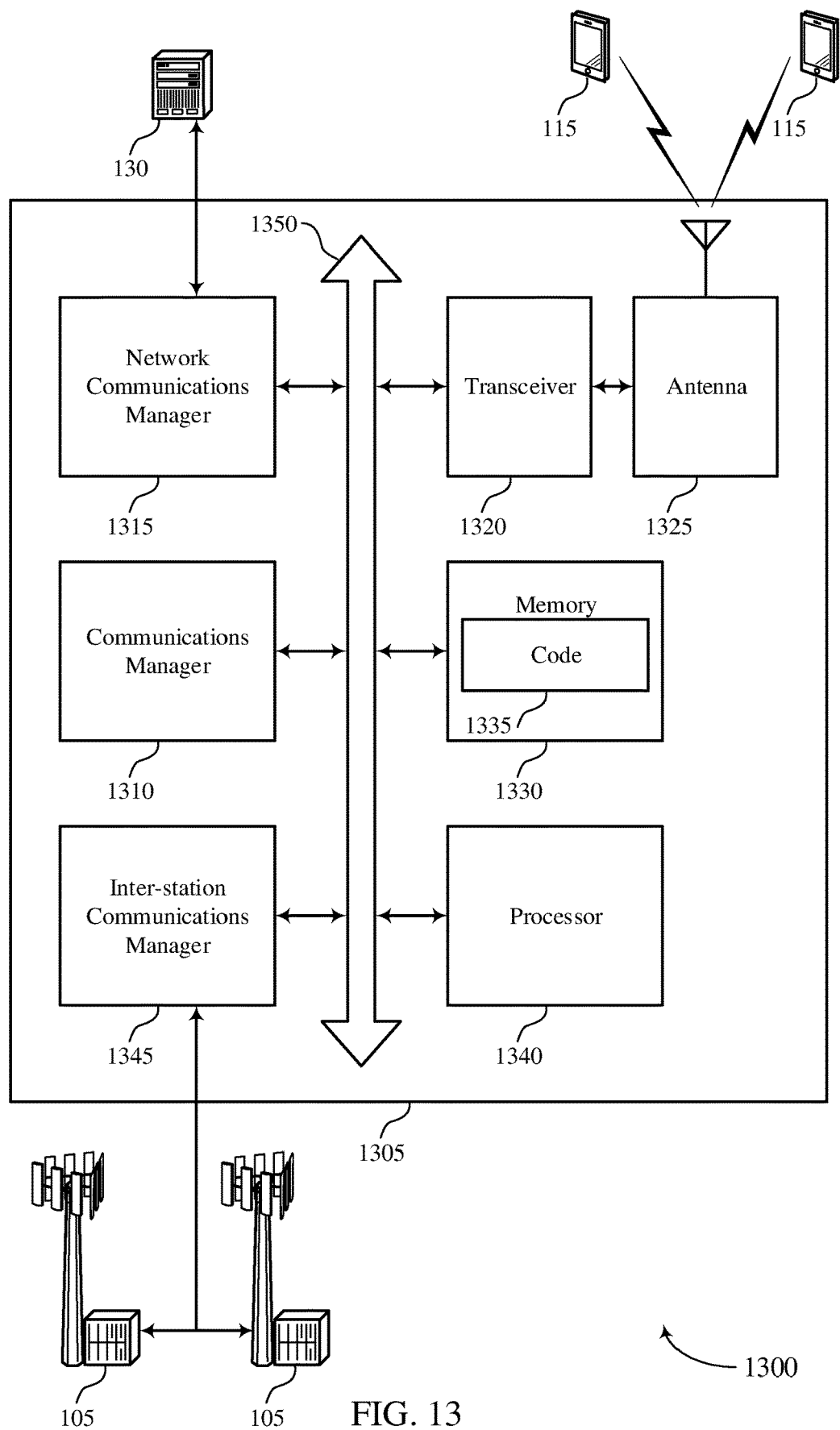
FIG. 13 shows a diagram of a system including a device that supports wake-up signal design for multiple multicast sessions in accordance with aspects of the present disclosure.

FIG. 13 shows a diagram of a system 1300 including a device 1305 that supports wake-up signal design for multiple multicast sessions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a set of multicast sessions configured for a UE, determine which of the set of multicast sessions the UE is to monitor during a wake-up cycle associated with a first multicast session of the set of multicast sessions, transmit one or more wake-up signal configurations for the set of multicast sessions to the UE, the one or more wake-up signal configurations indicating respective identifiers for each of the set of multicast sessions, and transmit a wake-up signal before an active duration of the first multicast session, the wake-up signal indicating which of the set of multicast sessions the UE is to monitor during the wake-up cycle associated with the first multicast session of the set of multicast sessions based on the determining.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting wake-up signal design for multiple multicast sessions).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
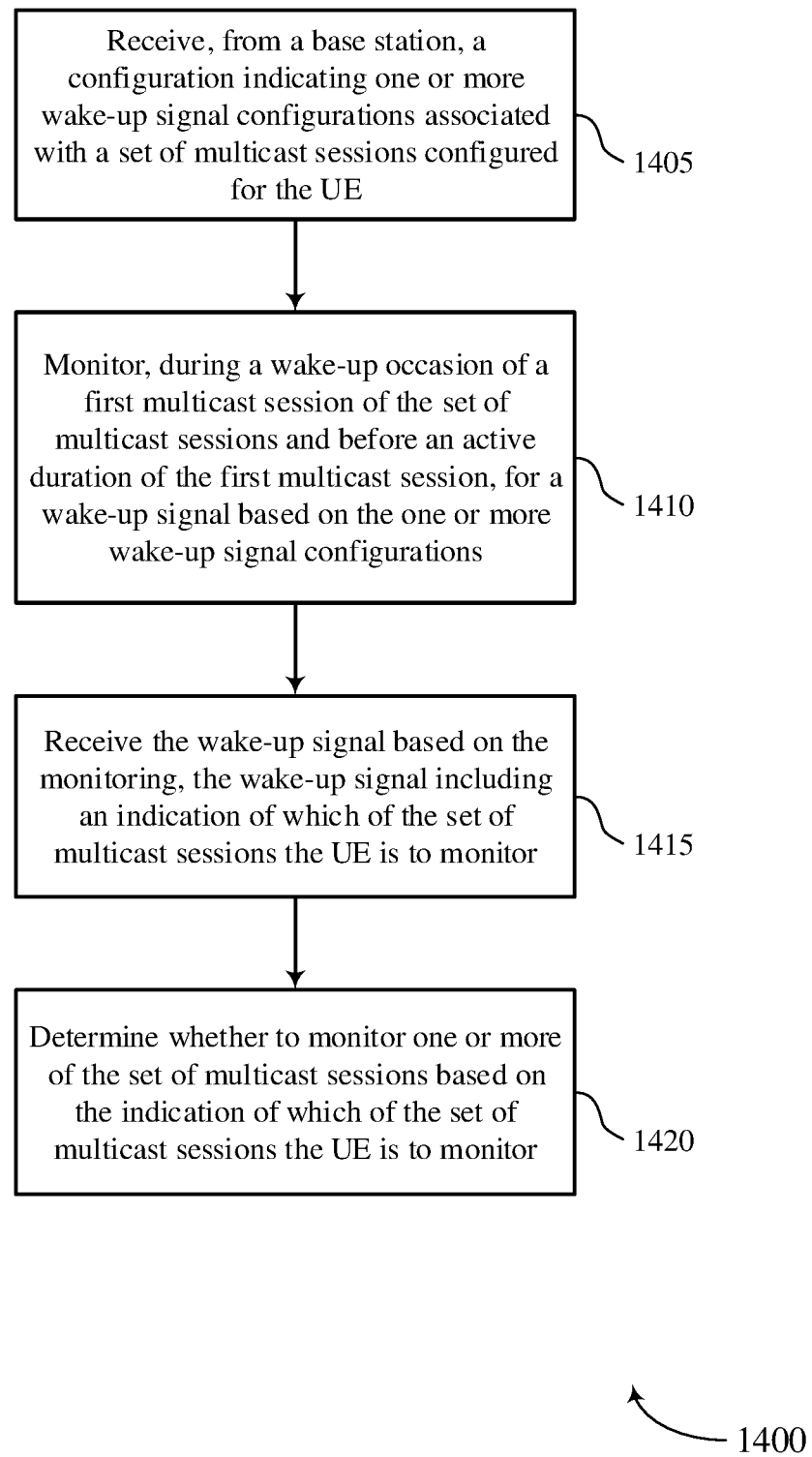
FIGS. 14 through 18 show flowcharts illustrating methods that support wake-up signal design for multiple multicast sessions in accordance with aspects of the present disclosure.

FIG. 14 shows a flowchart illustrating a method 1400 that supports wake-up signal design for multiple multicast sessions in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration indicating one or more wake-up signal configurations associated with a set of multicast sessions configured for the UE. The operations of 1405 may be performed according to the methods described herein. In some examples, aspects of the operations of 1405 may be performed by a configuration receiver as described with reference to FIGS. 6 through 9.

At 1410, the UE may monitor, during a wake-up occasion of a first multicast session of the set of multicast sessions and before an active duration of the first multicast session, for a wake-up signal based on the one or more wake-up signal configurations. The operations of 1410 may be performed according to the methods described herein. In some examples, aspects of the operations of 1410 may be performed by a wake-up signal receiver as described with reference to FIGS. 6 through 9.

At 1415, the UE may receive the wake-up signal based on the monitoring, the wake-up signal including an indication of which of the set of multicast sessions the UE is to monitor. The operations of 1415 may be performed according to the methods described herein. In some examples, aspects of the operations of 1415 may be performed by a wake-up signal receiver as described with reference to FIGS. 6 through 9.

At 1420, the UE may determine whether to monitor one or more of the set of multicast sessions based on the indication of which of the set of multicast sessions the UE is to monitor. The operations of 1420 may be performed according to the methods described herein. In some examples, aspects of the operations of 1420 may be performed by a multicast manager as described with reference to FIGS. 6 through 9.

Figure 15:
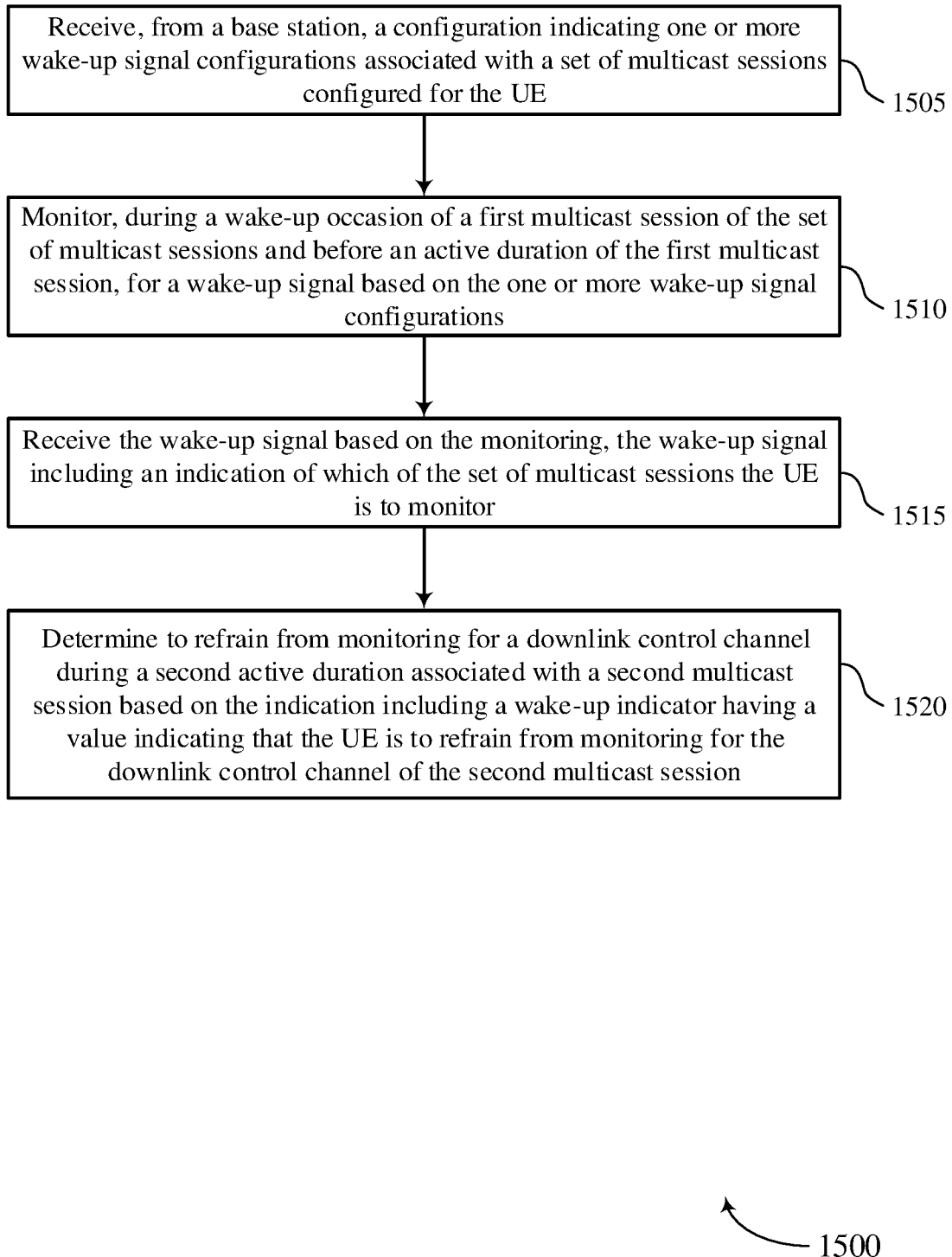

FIG. 15 shows a flowchart illustrating a method 1500 that supports wake-up signal design for multiple multicast sessions in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configuration indicating one or more wake-up signal configurations associated with a set of multicast sessions configured for the UE. The operations of 1505 may be performed according to the methods described herein. In some examples, aspects of the operations of 1505 may be performed by a configuration receiver as described with reference to FIGS. 6 through 9.

At 1510, the UE may monitor, during a wake-up occasion of a first multicast session of the set of multicast sessions and before an active duration of the first multicast session, for a wake-up signal based on the one or more wake-up signal configurations. The operations of 1510 may be performed according to the methods described herein. In some examples, aspects of the operations of 1510 may be performed by a wake-up signal receiver as described with reference to FIGS. 6 through 9.

At 1515, the UE may receive the wake-up signal based on the monitoring, the wake-up signal including an indication of which of the set of multicast sessions the UE is to monitor. The operations of 1515 may be performed according to the methods described herein. In some examples, aspects of the operations of 1515 may be performed by a wake-up signal receiver as described with reference to FIGS. 6 through 9.

At 1520, the UE may determine to refrain from monitoring for a downlink control channel during a second active duration associated with a second multicast session based on the indication including a wake-up indicator having a value indicating that the UE is to refrain from monitoring for the downlink control channel of the second multicast session. The operations of 1520 may be performed according to the methods described herein. In some examples, aspects of the operations of 1520 may be performed by a multicast manager as described with reference to FIGS. 6 through 9.

Figure 16:
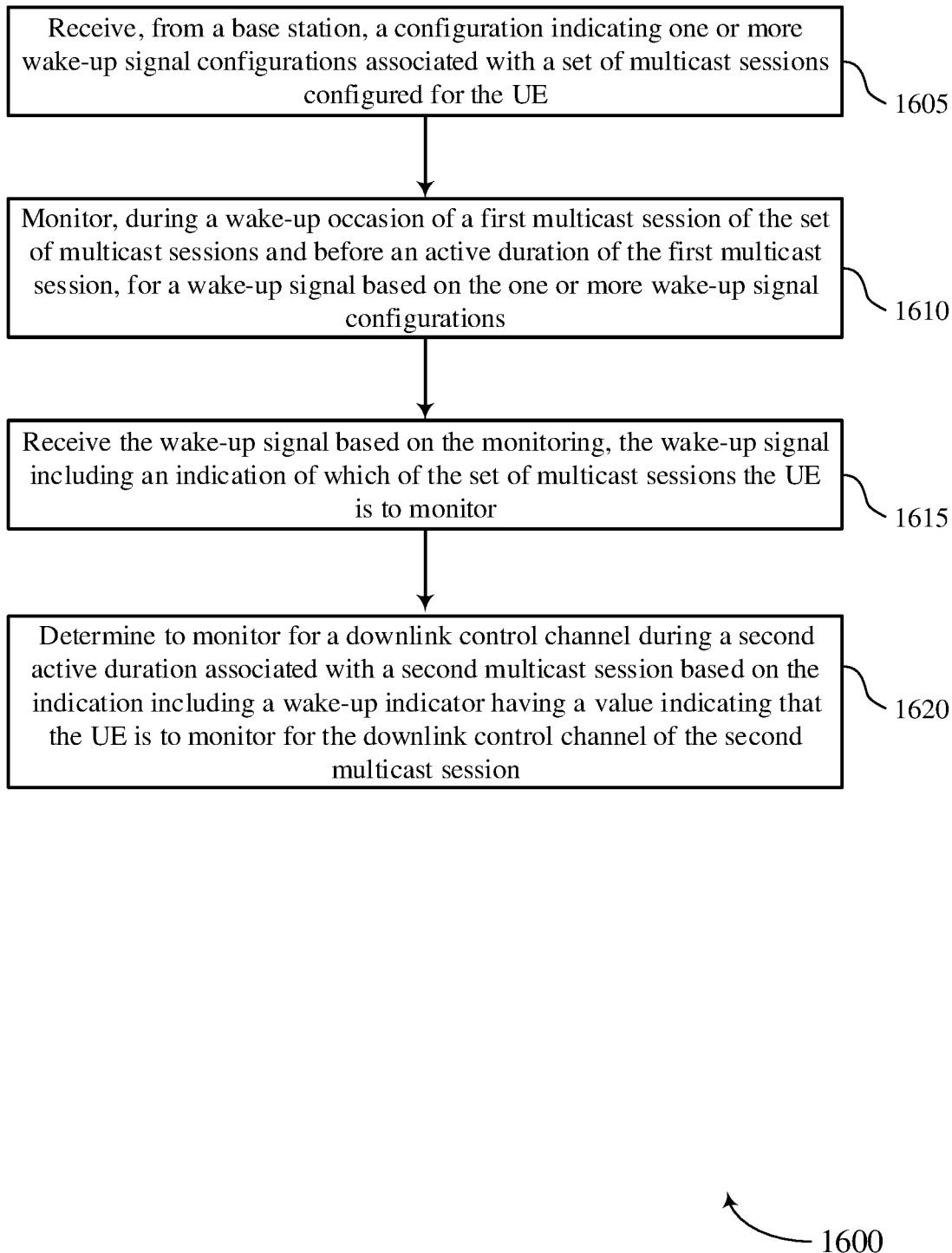

FIG. 16 shows a flowchart illustrating a method 1600 that supports wake-up signal design for multiple multicast sessions in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a configuration indicating one or more wake-up signal configurations associated with a set of multicast sessions configured for the UE. The operations of 1605 may be performed according to the methods described herein. In some examples, aspects of the operations of 1605 may be performed by a configuration receiver as described with reference to FIGS. 6 through 9.

At 1610, the UE may monitor, during a wake-up occasion of a first multicast session of the set of multicast sessions and before an active duration of the first multicast session, for a wake-up signal based on the one or more wake-up signal configurations. The operations of 1610 may be performed according to the methods described herein. In some examples, aspects of the operations of 1610 may be performed by a wake-up signal receiver as described with reference to FIGS. 6 through 9.

At 1615, the UE may receive the wake-up signal based on the monitoring, the wake-up signal including an indication of which of the set of multicast sessions the UE is to monitor. The operations of 1615 may be performed according to the methods described herein. In some examples, aspects of the operations of 1615 may be performed by a wake-up signal receiver as described with reference to FIGS. 6 through 9.

At 1620, the UE may determine to monitor for a downlink control channel during a second active duration associated with a second multicast session based on the indication including a wake-up indicator having a value indicating that the UE is to monitor for the downlink control channel of the second multicast session. The operations of 1620 may be performed according to the methods described herein. In some examples, aspects of the operations of 1620 may be performed by a multicast manager as described with reference to FIGS. 6 through 9.

Figure 17:
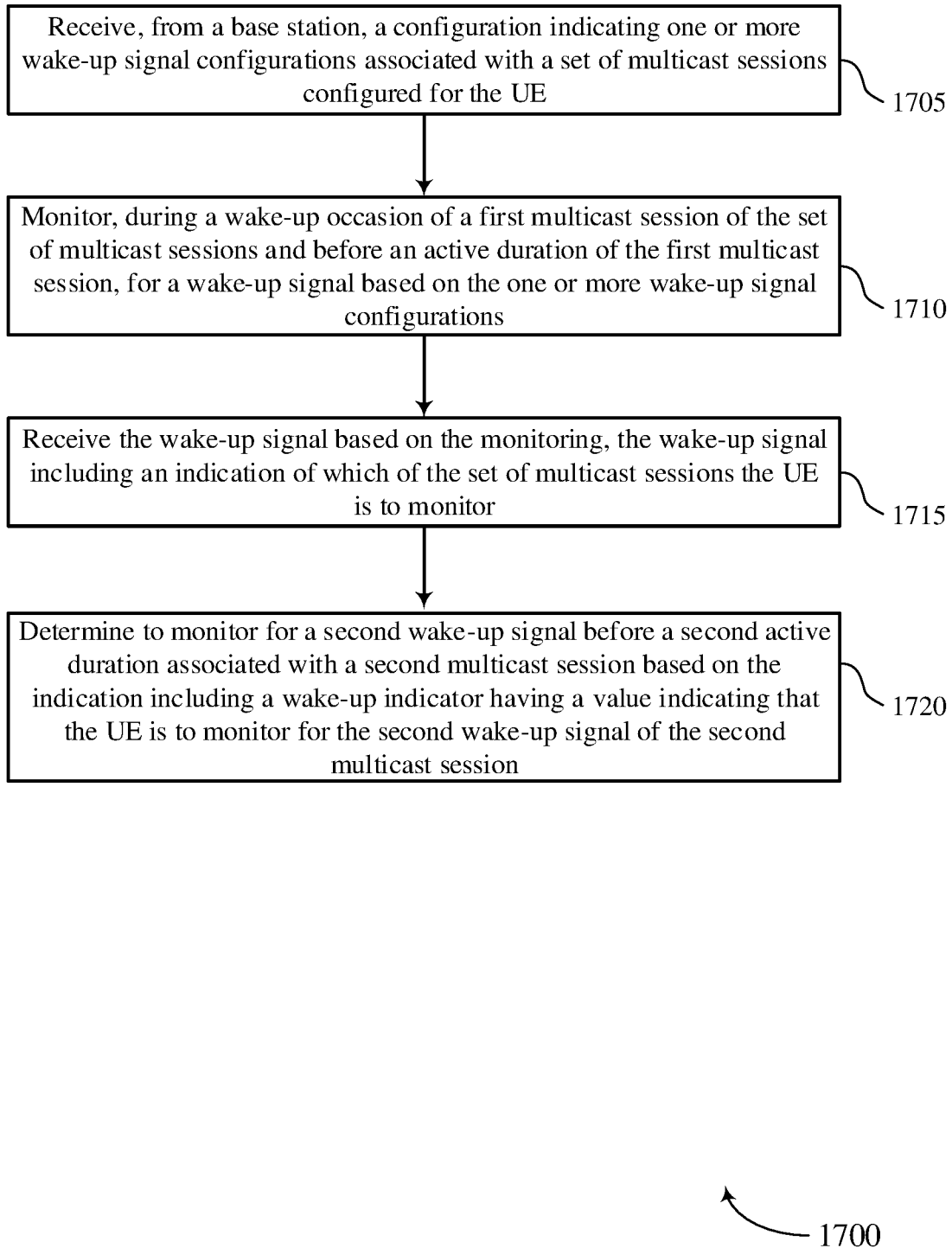

FIG. 17 shows a flowchart illustrating a method 1700 that supports wake-up signal design for multiple multicast sessions in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a configuration indicating one or more wake-up signal configurations associated with a set of multicast sessions configured for the UE. The operations of 1705 may be performed according to the methods described herein. In some examples, aspects of the operations of 1705 may be performed by a configuration receiver as described with reference to FIGS. 6 through 9.

At 1710, the UE may monitor, during a wake-up occasion of a first multicast session of the set of multicast sessions and before an active duration of the first multicast session, for a wake-up signal based on the one or more wake-up signal configurations. The operations of 1710 may be performed according to the methods described herein. In some examples, aspects of the operations of 1710 may be performed by a wake-up signal receiver as described with reference to FIGS. 6 through 9.

At 1715, the UE may receive the wake-up signal based on the monitoring, the wake-up signal including an indication of which of the set of multicast sessions the UE is to monitor. The operations of 1715 may be performed according to the methods described herein. In some examples, aspects of the operations of 1715 may be performed by a wake-up signal receiver as described with reference to FIGS. 6 through 9.

At 1720, the UE may determine to monitor for a second wake-up signal before a second active duration associated with a second multicast session based on the indication including a wake-up indicator having a value indicating that the UE is to monitor for the second wake-up signal of the second multicast session. The operations of 1720 may be performed according to the methods described herein. In some examples, aspects of the operations of 1720 may be performed by a multicast manager as described with reference to FIGS. 6 through 9.

Figure 18:
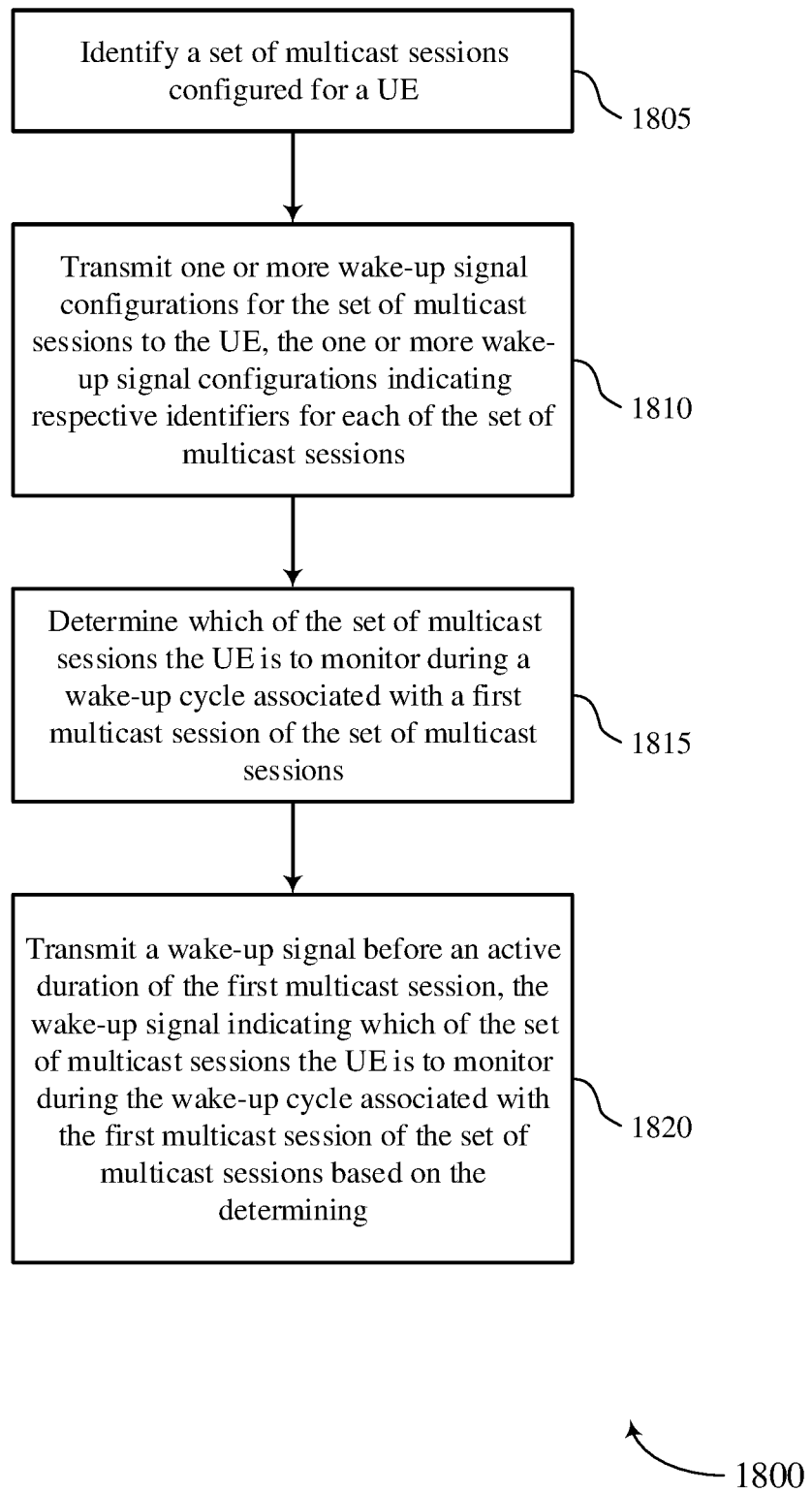

FIG. 18 shows a flowchart illustrating a method 1800 that supports wake-up signal design for multiple multicast sessions in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may identify a set of multicast sessions configured for a UE. The operations of 1805 may be performed according to the methods described herein. In some examples, aspects of the operations of 1805 may be performed by a multicast manager as described with reference to FIGS. 10 through 13.

At 1810, the base station may transmit one or more wake-up signal configurations for the set of multicast sessions to the UE, the one or more wake-up signal configurations indicating respective identifiers for each of the set of multicast sessions. The operations of 1810 may be performed according to the methods described herein. In some examples, aspects of the operations of 1810 may be performed by a configuration transmitter as described with reference to FIGS. 10 through 13.

At 1815, the base station may determine which of the set of multicast sessions the UE is to monitor during a wake-up cycle associated with a first multicast session of the set of multicast sessions. The operations of 1815 may be performed according to the methods described herein. In some examples, aspects of the operations of 1815 may be performed by a multicast manager as described with reference to FIGS. 10 through 13.

At 1820, the base station may transmit a wake-up signal before an active duration of the first multicast session, the wake-up signal indicating which of the set of multicast sessions the UE is to monitor during the wake-up cycle associated with the first multicast session of the set of multicast sessions based on the determining. The operations of 1820 may be performed according to the methods described herein. In some examples, aspects of the operations of 1820 may be performed by a wake-up signal transmitter as described with reference to FIGS. 10 through 13.

Example 1: A method for wireless communications at a UE, comprising: receiving, from a base station, a configuration indicating one or more wake-up signal configurations associated with a set of multicast sessions configured for the UE; monitoring, during a wake-up occasion of a first multicast session of the set of multicast sessions and before an active duration of the first multicast sessions, for a wake-up signal based at least in part on the one or more wake-up signal configurations; receiving the wake-up signal based at least in part on the monitoring, the wake-up signal comprising an indication of which of the set of multicast sessions the UE is to monitor; and determining whether to monitor one or more of the set of multicast sessions based at least in part on the indication of which of the set of multicast sessions the UE is to monitor.

Example 2: The method of example 1, further comprising: receiving a set of indicators corresponding to the set of multicast sessions in the wake-up signal, wherein each of the set of indicators corresponds to a respective multicast session of the set of multicast sessions; determining which of the set of multicast session the UE is to monitor based at least in part on the set of indicators; and monitoring the one or more of the set of multicast sessions based at least in part on determining which of the set of multicast sessions the UE is to monitor.

Example 3: The method of any of examples 1 or 2, wherein determining whether to monitor one or more of the set of multicast sessions comprises: determining to refrain from monitoring for a downlink control channel during a second active duration associated with a second multicast sessions based at least in part on the indication comprising a wake-up indicator having a value indicating that the UE is to refrain from monitoring for the downlink control channel of the second multicast session.

Example 4: The method of any of examples 1 or 2, wherein determining whether to monitor one or more of the set of multicast sessions comprises: determining to monitor for a downlink control channel during a second active duration associated with a second multicast sessions based at least in part on the indication comprising a wake-up indicator having a value indicating that the UE is to monitor for the downlink control channel of the second multicast sessions.

Example 5: The method of any of examples 1 or 2, wherein determining whether to monitor one or more of the set o multicast sessions comprises: determining to monitor for a second wake-up signal before a second active duration associated with a second multicast session based at least in part on the indication comprising a wake-up indicator having a value indicating that the UE is to monitor for the second wake-up signal of the second multicast sessions.

Example 6: The method of any of examples 1 or 2, wherein determining whether to monitor one or more of the set of multicast sessions comprises: determining to monitor for a downlink control channel during the active duration of the first multicast session based at least in part on the indication comprising a first wake-up indicator having a first value indicating that the UE is to monitor for the downlink control channel of the first multicast session; and determining to monitor a second multicast session of the set of multicast sessions based at least in part on the indication comprising a second wake-up indicator having a second value indicating that the UE is to monitor for the second multicast session.

Example 7: The method of example 6, further comprising: monitoring for a second wake-up signal or a second downlink control channel associated with the second multicast session based at least in part on determining to monitor the second multicast session.

Example 8: The method of any of examples 1 or 2, wherein the indication instructs the UE to monitor at least one multicast session, the method further comprising: monitoring all active durations associated with the at least one multicast session during a wake-up cycle of the first multicast session based at least in part on the indication.

Example 9: The method of any of examples 1 or 2, wherein determining whether to monitor one or more of the set of multicast sessions comprises: refraining from monitoring the one or more of the set of multicast sessions during wake-up cycle of the first multicast session based at least in part on the indication.

Example 10: The method of any of examples 1 through 9, wherein receiving the wake-up signal comprises: receiving DCI that includes the wake-up signal, the DCI associated with a wake-up multicast radio network temporary identifier common to all UEs in a cell supported by the base station.

Example 11: The method of any of examples 1 through 10, further comprising: receiving a downlink control message from the base station indicating respective wake-up multicast radio network temporary identifiers for each of the set of multicast sessions configured for the UE.

Example 12: The method of example 11, wherein the downlink control message is received via RRC, DCI, or a MAC-CE.

Example 13: The method of any of examples 1 through 12, wherein receiving the one or more wake-up signal configurations comprises: receiving a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

Example 14: The method of any of examples 1 through 13, wherein receiving the one or more wake-up signal configurations comprises: receiving at least one of a number of multicast sessions associated with the set of multicast sessions, a discontinuous reception configuration, or one or more radio network temporary identifiers associated with the set of multicast sessions.

Example 15: The method of any of examples 1 through 14, wherein receiving the one or more wake-up signal configurations comprises: receiving the one or more wake-up signal configurations via RRC, DCI, or a MAC-CE.

Example 16: The method of any of examples 1 through 15, wherein receiving the wake-up signal comprises: receiving the wake-up signal before the active duration of a discontinuous reception cycle associated with the first multicast session.

Example 17: The method of any of examples 1 through 16, further comprising: selecting the first multicast session of the set of multicast sessions for monitoring by the UE based at least in part on a length of a discontinuous reception cycle associated with the first multicast session.

Example 18: The method of example 17, wherein the length of the discontinuous reception cycle corresponding to a longest length of a shortest length of all multicast sessions of the set of multicast sessions.

Example 19: A method for wireless communications at a base station, comprising: identifying a set of multicast sessions configured for a UE; transmitting one or more wake-up signal configurations for the set of multicast sessions to the UE, the one or more wake-up signal configurations indicating respective identifiers for each of the set of multicast sessions; determining which of the set of multicast sessions the UE is to monitor during a wake-up cycle associated with a first multicast session of the set of multicast sessions; and transmitting a wake-up signal before an active duration of the first multicast session, the wake-up signal indicating which of the set of multicast sessions the UE is to monitor during the wake-up cycle associated with the first multicast session of the set of multicast sessions based at least in part on the determining.

Example 20: The method of example 19, wherein transmitting the wake-up signal comprises: transmitting a set of indicators corresponding to the set of multicast sessions in the wake-up signal, the set of indicators indicating which of the set of multicast sessions the UE is to monitor, wherein each of the set of indicators corresponds to a respective multicast session of the set of multicast sessions, and wherein each indicator instructs the UE whether to monitor the respective multicast session.

Example 21: The method of any of examples 19 or 20, further comprising: determining that the UE is to refrain from monitoring for a downlink control channel during a second active duration associated with a second multicast session, wherein the wake-up signal comprises a wake-up indicator having a value indicating that the UE is to refrain from monitoring for the downlink control channel of the second multicast session.

Example 22: The method of any of examples 19 or 20, further comprising: determining that the UE is to monitor for a downlink control channel during a second active duration associated with a second multicast session, wherein the wake-up signal comprises a wake-up indicator having a value indicating that the UE is to monitor for the downlink control channel of the second multicast session.

Example 23: The method of any of examples 19 or 20, further comprising: determining that the UE is to monitor for a second wake-up signal before a second active duration associated with a second multicast session, wherein the wake-up signal comprises a wake-up indicator having a value indicating that the UE is to monitor for the second wake-up signal of the second multicast session.

Example 24: The method of any of claims 19 or 20, further comprising: determining that the UE is to monitor for a downlink control channel during the active duration of the first multicast session, wherein the wake-up signal comprises a first wake-up indicator having a first value indicating that the UE is to monitor for the downlink control channel of the first multicast session; and determining that the UE is to monitor a second multicast session, wherein the wake-up signal comprises a second wake-up indicator having a second value indicating that the UE is to monitor the second multicast session.

Example 25: The method of any of examples 19 through 24, wherein transmitting the one or more wake-up signal configurations comprises: transmitting a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

Example 26: The method of any of examples 19 through 25, wherein transmitting the one or more wake-up signal configurations comprises: transmitting at least one of a number of multicast sessions associated with the set of multicast sessions, a discontinuous reception configuration, or one or more radio network temporary identifiers associated with the set of multicast sessions.

Example 27: The method of any of examples 19 through 26, wherein transmitting the one or more wake-up signal configurations comprises: transmitting the one or more wake-up signal configurations via RRC, DCI, or a MAC-CE.

Example 28: The method of any of examples 19 through 27, further comprising: transmitting DCI including the wake-up signal in a wake-up occasion associated with the first multicast session.

Example 29: The method of example 28, wherein the DCI is for a group of UEs including the UE supported by a cell of the base station.

Example 30: The method of any of examples 28 or 29, wherein the DCI is scrambled with a wake-up multicast radio network temporary identifier specific to the first multicast session.

Example 31: An apparatus for wireless communication comprising at least one means for performing a method of any of examples 1 through 18.

Example 32: An apparatus for wireless communication comprising at least one means for performing a method of any of example 19 through 30.

Example 33: An apparatus for wireless communications comprising a processor; and memory coupled to the processor, the memory and processor configured to perform a method of any of examples 1 through 18.

Example 34: An apparatus for wireless communications comprising a processor; and memory coupled to the processor, the memory and processor configured to perform a method of any of examples 19 through 30.

Example 35: A non-transitory computer-readable medium storing code for wireless communication comprising a processor, memory coupled to the processor, and instructions stored in the memory and executable by the processor to cause the apparatus to perform a method of any of examples 1 through 18.

Example 36: A non-transitory computer-readable medium storing code for wireless communication comprising a processor, memory coupled to the processor, and instructions stored in the memory and executable by the processor to cause the apparatus to perform a method of any of examples 19 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an application-specific integrated circuit (ASIC), a central processing unit (CPU), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, a configuration indicating one or more wake-up signal configurations associated with a set of multicast sessions configured for the UE;
   monitoring, during a wake-up occasion of a first multicast session of the set of multicast sessions and before an active duration of the first multicast session, for a wake-up signal based at least in part on the one or more wake-up signal configurations;
   receiving the wake-up signal based at least in part on the monitoring, the wake-up signal comprising an indication of which of the set of multicast sessions the UE is to monitor; and
   determining whether to monitor one or more of the set of multicast sessions based at least in part on the indication of which of the set of multicast sessions the UE is to monitor.

2. The method of claim 1, further comprising:
   receiving a set of indicators corresponding to the set of multicast sessions in the wake-up signal, wherein each of the set of indicators corresponds to a respective multicast session of the set of multicast sessions;
   determining which of the set of multicast sessions the UE is to monitor based at least in part on the set of indicators; and
   monitoring the one or more of the set of multicast sessions based at least in part on determining which of the set of multicast sessions the UE is to monitor.

3. The method of claim 1, wherein determining whether to monitor one or more of the set of multicast sessions comprises:
   determining to refrain from monitoring for a downlink control channel during a second active duration associated with a second multicast session based at least in part on the indication comprising a wake-up indicator having a value indicating that the UE is to refrain from monitoring for the downlink control channel of the second multicast session.

4. The method of claim 1, wherein determining whether to monitor one or more of the set of multicast sessions comprises:
   determining to monitor for a downlink control channel during a second active duration associated with a second multicast session based at least in part on the indication comprising a wake-up indicator having a value indicating that the UE is to monitor for the downlink control channel of the second multicast session.

5. The method of claim 1, wherein determining whether to monitor one or more of the set of multicast sessions comprises:
   determining to monitor for a second wake-up signal before a second active duration associated with a second multicast session based at least in part on the indication comprising a wake-up indicator having a value indicating that the UE is to monitor for the second wake-up signal of the second multicast session.

6. The method of claim 1, wherein determining whether to monitor one or more of the set of multicast sessions comprises:
   determining to monitor for a downlink control channel during the active duration of the first multicast session based at least in part on the indication comprising a first wake-up indicator having a first value indicating that the UE is to monitor for the downlink control channel of the first multicast session; and
   determining to monitor a second multicast session of the set of multicast sessions based at least in part on the indication comprising a second wake-up indicator having a second value indicating that the UE is to monitor for the second multicast session.

7. The method of claim 6, further comprising:
   monitoring for a second wake-up signal or a second downlink control channel associated with the second multicast session based at least in part on determining to monitor the second multicast session.

8. The method of claim 1, wherein the indication instructs the UE to monitor at least one multicast session, the method further comprising:
   monitoring all active durations associated with the at least one multicast session during a wake-up cycle of the first multicast session based at least in part on the indication.

9. The method of claim 1, wherein determining whether to monitor one or more of the set of multicast sessions comprises:
   refraining from monitoring the one or more of the set of multicast sessions during a wake-up cycle of the first multicast session based at least in part on the indication.

10. The method of claim 1, wherein receiving the wake-up signal comprises:
    receiving downlink control information (DCI) that includes the wake-up signal, the DCI associated with a wake-up multicast radio network temporary identifier common to all UEs in a cell supported by the base station.

11. The method of claim 1, further comprising:
    receiving a downlink control message from the base station indicating respective wake-up multicast radio network temporary identifiers for each of the set of multicast sessions configured for the UE.

12. The method of claim 11, wherein the downlink control message is received via radio resource control (RRC) signaling, downlink control information (DCI), or a medium access control (MAC) control element (MAC-CE).

13. The method of claim 1, wherein receiving the one or more wake-up signal configurations comprises:
    receiving a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

14. The method of claim 1, wherein receiving the one or more wake-up signal configurations comprises:
receiving at least one of a number of multicast sessions associated with the set of multicast sessions, a discontinuous reception configuration, or one or more radio network temporary identifiers associated with the set of multicast sessions.

15. The method of claim 1, wherein receiving the one or more wake-up signal configurations comprises:
receiving the one or more wake-up signal configurations via radio resource control (RRC) signaling, downlink control information (DCI), or a medium access control (MAC) control element (MAC-CE).

16. The method of claim 1, wherein receiving the wake-up signal comprises:
receiving the wake-up signal before the active duration of a discontinuous reception cycle associated with the first multicast session.

17. The method of claim 1, further comprising:
selecting the first multicast session of the set of multicast sessions for monitoring by the UE based at least in part on a length of a discontinuous reception cycle associated with the first multicast session.

18. The method of claim 17, wherein the length of the discontinuous reception cycle corresponding to a longest length or shortest length of all multicast sessions of the set of multicast sessions.

19. A method for wireless communications at a base station, comprising:
identifying a set of multicast sessions configured for a user equipment (UE);
transmitting one or more wake-up signal configurations for the set of multicast sessions to the UE, the one or more wake-up signal configurations indicating respective identifiers for each of the set of multicast sessions;
determining which of the set of multicast sessions the UE is to monitor during a wake-up cycle associated with a first multicast session of the set of multicast sessions; and
transmitting a wake-up signal before an active duration of the first multicast session, the wake-up signal indicating which of the set of multicast sessions the UE is to monitor during the wake-up cycle associated with the first multicast session of the set of multicast sessions based at least in part on the determining.

20. The method of claim 19, wherein transmitting the wake-up signal comprises:
transmitting a set of indicators corresponding to the set of multicast sessions in the wake-up signal, the set of indicators indicating which of the set of multicast sessions the UE is to monitor, wherein each of the set of indicators corresponds to a respective multicast session of the set of multicast sessions, and wherein each indicator instructs the UE whether to monitor the respective multicast session.

21. The method of claim 19, further comprising:
determining that the UE is to refrain from monitoring for a downlink control channel during a second active duration associated with a second multicast session, wherein the wake-up signal comprises a wake-up indicator having a value indicating that the UE is to refrain from monitoring for the downlink control channel of the second multicast session.

22. The method of claim 19, further comprising:
determining that the UE is to monitor for a downlink control channel during a second active duration associated with a second multicast session, wherein the wake-up signal comprises a wake-up indicator having a value indicating that the UE is to monitor for the downlink control channel of the second multicast session.

23. The method of claim 19, further comprising:
determining that the UE is to monitor for a second wake-up signal before a second active duration associated with a second multicast session, wherein the wake-up signal comprises a wake-up indicator having a value indicating that the UE is to monitor for the second wake-up signal of the second multicast session.

24. The method of claim 19, further comprising:
determining that the UE is to monitor for a downlink control channel during the active duration of the first multicast session, wherein the wake-up signal comprises a first wake-up indicator having a first value indicating that the UE is to monitor for the downlink control channel of the first multicast session; and
determining that the UE is to monitor a second multicast session, wherein the wake-up signal comprises a second wake-up indicator having a second value indicating that the UE is to monitor the second multicast session.

25. The method of claim 19, wherein transmitting the one or more wake-up signal configurations comprises:
transmitting a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

26. The method of claim 19, wherein transmitting the one or more wake-up signal configurations comprises:
transmitting at least one of a number of multicast sessions associated with the set of multicast sessions, a discontinuous reception configuration, or one or more radio network temporary identifiers associated with the set of multicast sessions.

27. The method of claim 19, wherein transmitting the one or more wake-up signal configurations comprises:
transmitting the one or more wake-up signal configurations via radio resource control (RRC) signaling, downlink control information (DCI), or a medium access control (MAC) control element (MAC-CE).

28. The method of claim 19, further comprising:
transmitting downlink control information (DCI) including the wake-up signal in a wake-up occasion associated with the first multicast session.

29. The method of claim 28, wherein the DCI is for a group of UEs including the UE supported by a cell of the base station.

30. The method of claim 28, wherein the DCI is scrambled with a wake-up multicast radio network temporary identifier specific to the first multicast session.

31. An apparatus for wireless communications at a user equipment (UE), comprising:
a processor,
memory coupled with the processor; and
instructions stored in the memory and executable by the processor to cause the apparatus to:

receive, from a base station, a configuration indicating one or more wake-up signal configurations associated with a set of multicast sessions configured for the UE;

monitor, during a wake-up occasion of a first multicast session of the set of multicast sessions and before an active duration of the first multicast session, for a wake-up signal based at least in part on the one or more wake-up signal configurations;

receive the wake-up signal based at least in part on the monitoring, the wake-up signal comprising an indication of which of the set of multicast sessions the UE is to monitor; and determine whether to monitor one or more of the set of multicast sessions based at least in part on the indication of which of the set of multicast sessions the UE is to monitor.

32. The apparatus of claim 31, wherein the instructions are further executable by the processor to cause the apparatus to:

receive a set of indicators corresponding to the set of multicast sessions in the wake-up signal, wherein each of the set of indicators corresponds to a respective multicast session of the set of multicast sessions;

determine which of the set of multicast sessions to the UE is to monitor based at least in part on the set of indicators; and monitor the one or more of the set of multicast sessions based at least in part on determining which of the set of multicast sessions to the UE is to monitor.

33. The apparatus of claim 31, wherein the instructions to determine whether to monitor one or more of the set of multicast sessions are executable by the processor to cause the apparatus to:

determine to refrain from monitoring for a downlink control channel during a second active duration associated with a second multicast session based at least in part on the indication comprising a wake-up indicator having a value indicating that the UE is to refrain from monitoring for the downlink control channel of the second multicast session.

34. The apparatus of claim 31, wherein the instructions to determine whether to monitor one or more of the set of multicast sessions are executable by the processor to cause the apparatus to:

determine to monitor for a downlink control channel during a second active duration associated with a second multicast session based at least in part on the indication comprising a wake-up indicator having a value indicating that the UE is to monitor for the downlink control channel of the second multicast session.

35. The apparatus of claim 31, wherein the instructions to determine whether to monitor one or more of the set of multicast sessions are executable by the processor to cause the apparatus to:

determine to monitor for a second wake-up signal before a second active duration associated with a second multicast session based at least in part on the indication comprising a wake-up indicator having a value indicating that the UE is to monitor for the second wake-up signal of the second multicast session.

36. The apparatus of claim 31, wherein the instructions to determine whether to monitor one or more of the set of multicast sessions are executable by the processor to cause the apparatus to:

determine to monitor for a downlink control channel during the active duration of the first multicast session based at least in part on the indication comprising a first wake-up indicator having a first value indicating that the UE is to monitor for the downlink control channel of the first multicast session; and determine to monitor a second multicast session of the set of multicast sessions based at least in part on the indication comprising a second wake-up indicator having a second value indicating that the UE is to monitor for the second multicast session.

37. The apparatus of claim 36, wherein the instructions are further executable by the processor to cause the apparatus to:

monitor for a second wake-up signal or a second downlink control channel associated with the second multicast session based at least in part on determining to monitor the second multicast session.

38. The apparatus of claim 31, wherein the indication instructs the UE to monitor at least one multicast session, the method further comprising monitoring all active durations associated with the at least one multicast session during a wake-up cycle of the first multicast session based at least in part on the indication.

39. The apparatus of claim 31, wherein the instructions to determine whether to monitor one or more of the set of multicast sessions are executable by the processor to cause the apparatus to:

refrain from monitoring the one or more of the set of multicast sessions during a wake-up cycle of the first multicast session based at least in part on the indication.

40. The apparatus of claim 31, wherein the instructions to receive the wake-up signal are executable by the processor to cause the apparatus to:

receive downlink control information (DCI) that includes the wake-up signal, the DCI associated with a wake-up multicast radio network temporary identifier common to all UEs in a cell supported by the base station.

41. The apparatus of claim 31, wherein the instructions are further executable by the processor to cause the apparatus to:

receive a downlink control message from the base station indicating respective wake-up multicast radio network temporary identifiers for each of the set of multicast sessions configured for the UE.

42. The apparatus of claim 41, wherein the downlink control message is received via radio resource control (RRC) signaling, downlink control information (DCI), or a medium access control (MAC) control element (MAC-CE).

43. The apparatus of claim 31, wherein the instructions to receive the one or more wake-up signal configurations are executable by the processor to cause the apparatus to:

receive a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

44. The apparatus of claim 31, wherein the instructions to receive the one or more wake-up signal configurations are executable by the processor to cause the apparatus to:

receive at least one of a number of multicast sessions associated with the set of multicast sessions, a discontinuous reception configuration, or one or more radio network temporary identifiers associated with the set of multicast sessions.

45. The apparatus of claim 31, wherein the instructions to receive the one or more wake-up signal configurations are executable by the processor to cause the apparatus to:
receive the one or more wake-up signal configurations via radio resource control (RRC) signaling, downlink control information (DCI), or a medium access control (MAC) control element (MAC-CE).

46. The apparatus of claim 31, wherein the instructions to receive the wake-up signal are executable by the processor to cause the apparatus to:
receive the wake-up signal before the active duration of a discontinuous reception cycle associated with the first multicast session.

47. The apparatus of claim 31, wherein the instructions are further executable by the processor to cause the apparatus to:
select the first multicast session of the set of multicast sessions for monitoring by the UE based at least in part on a length of a discontinuous reception cycle associated with the first multicast session.

48. The apparatus of claim 47, wherein the length of the discontinuous reception cycle corresponding to a longest length or shortest length of all multicast sessions of the set of multicast sessions.

49. An apparatus for wireless communications at a base station, comprising:
a processor;
memory coupled with the processor; and
instructions stored in the memory and executable by the processor to cause the apparatus to:
identify a set of multicast sessions configured for a user equipment (UE);
transmit one or more wake-up signal configurations for the set of multicast sessions to the UE, the one or more wake-up signal configurations indicating respective identifiers for each of the set of multicast sessions;
determine which of the set of multicast sessions the UE is to monitor during a wake-up cycle associated with a first multicast session of the set of multicast sessions; and
transmit a wake-up signal before an active duration of the first multicast session, the wake-up signal indicating which of the set of multicast sessions the UE is to monitor during the wake-up cycle associated with the first multicast session of the set of multicast sessions based at least in part on the determining.

50. The apparatus of claim 49, wherein the instructions to transmit the wake-up signal are executable by the processor to cause the apparatus to:
transmit a set of indicators corresponding to the set of multicast sessions in the wake-up signal, the set of indicators indicating which of the set of multicast sessions the UE is to monitor, wherein each of the set of indicators corresponds to a respective multicast session of the set of multicast sessions, and wherein each indicator instructs the UE whether to monitor the respective multicast session.

51. The apparatus of claim 49, wherein the instructions are further executable by the processor to cause the apparatus to:
determine that the UE is to refrain from monitoring for a downlink control channel during a second active duration associated with a second multicast session, wherein the wake-up signal comprises a wake-up indicator having a value indicating that the UE is to refrain from monitoring for the downlink control channel of the second multicast session.

52. The apparatus of claim 49, wherein the instructions are further executable by the processor to cause the apparatus to:
determine that the UE is to monitor for a downlink control channel during a second active duration associated with a second multicast session, wherein the wake-up signal comprises a wake-up indicator having a value indicating that the UE is to monitor for the downlink control channel of the second multicast session.

53. The apparatus of claim 49, wherein the instructions are further executable by the processor to cause the apparatus to:
determine that the UE is to monitor for a second wake-up signal before a second active duration associated with a second multicast session, wherein the wake-up signal comprises a wake-up indicator having a value indicating that the UE is to monitor for the second wake-up signal of the second multicast session.

54. The apparatus of claim 49, wherein the instructions are further executable by the processor to cause the apparatus to:
determine that the UE is to monitor for a downlink control channel during the active duration of the first multicast session, wherein the wake-up signal comprises a first wake-up indicator having a first value indicating that the UE is to monitor for the downlink control channel of the first multicast session; and
determine that the UE is to monitor a second multicast session, wherein the wake-up signal comprises a second wake-up indicator having a second value indicating that the UE is to monitor the second multicast session.

55. The apparatus of claim 49, wherein the instructions to transmit the one or more wake-up signal configurations are executable by the processor to cause the apparatus to:
transmit a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

56. The apparatus of claim 49, wherein the instructions to transmit the one or more wake-up signal configurations are executable by the processor to cause the apparatus to:
transmit at least one of a number of multicast sessions associated with the set of multicast sessions, a discontinuous reception configuration, or one or more radio network temporary identifiers associated with the set of multicast sessions.

57. The apparatus of claim 49, wherein the instructions to transmit the one or more wake-up signal configurations are executable by the processor to cause the apparatus to:
transmit the one or more wake-up signal configurations via radio resource control (RRC) signaling, downlink control information (DCI), or a medium access control (MAC) control element (MAC-CE).

58. The apparatus of claim 49, wherein the instructions are further executable by the processor to cause the apparatus to:

transmit downlink control information (DCI) including the wake-up signal in a wake-up occasion associated with the first multicast session.

59. The apparatus of claim 58, wherein the DCI is for a group of UEs including the UE supported by a cell of the base station.

60. The apparatus of claim 58, wherein the DCI is scrambled with a wake-up multicast radio network temporary identifier specific to the first multicast session.

61. An apparatus for wireless communications at a user equipment (UE), comprising:
means for receiving, from a base station, a configuration indicating one or more wake-up signal configurations associated with a set of multicast sessions configured for the UE;
means for monitoring, during a wake-up occasion of a first multicast session of the set of multicast sessions and before an active duration of the first multicast session, for a wake-up signal based at least in part on the one or more wake-up signal configurations;
means for receiving the wake-up signal based at least in part on the monitoring, the wake-up signal comprising an indication of which of the set of multicast sessions the UE is to monitor; and
means for determining whether to monitor one or more of the set of multicast sessions based at least in part on the indication of which of the set of multicast sessions the UE is to monitor.

62. The apparatus of claim 61, further comprising:
means for receiving a set of indicators corresponding to the set of multicast sessions in the wake-up signal, wherein each of the set of indicators corresponds to a respective multicast session of the set of multicast sessions;
means for determining which of the set of multicast sessions to the UE is to monitor based at least in part on the set of indicators; and
means for monitoring the one or more of the set of multicast sessions based at least in part on determining which of the set of multicast sessions to the UE is to monitor.

63. The apparatus of claim 61, wherein the means for determining whether to monitor one or more of the set of multicast sessions comprises:
means for determining to refrain from monitoring for a downlink control channel during a second active duration associated with a second multicast session based at least in part on the indication comprising a wake-up indicator having a value indicating that the UE is to refrain from monitoring for the downlink control channel of the second multicast session.

64. The apparatus of claim 61, wherein the means for determining whether to monitor one or more of the set of multicast sessions comprises:
means for determining to monitor for a downlink control channel during a second active duration associated with a second multicast session based at least in part on the indication comprising a wake-up indicator having a value indicating that the UE is to monitor for the downlink control channel of the second multicast session.

65. The apparatus of claim 61, wherein the means for determining whether to monitor one or more of the set of multicast sessions comprises:
means for determining to monitor for a second wake-up signal before a second active duration associated with a second multicast session based at least in part on the indication comprising a wake-up indicator having a value indicating that the UE is to monitor for the second wake-up signal of the second multicast session.

66. The apparatus of claim 61, wherein the means for determining whether to monitor one or more of the set of multicast sessions comprises:
means for determining to monitor for a downlink control channel during the active duration of the first multicast session based at least in part on the indication comprising a first wake-up indicator having a first value indicating that the UE is to monitor for the downlink control channel of the first multicast session; and
means for determining to monitor a second multicast session of the set of multicast sessions based at least in part on the indication comprising a second wake-up indicator having a second value indicating that the UE is to monitor for the second multicast session.

67. The apparatus of claim 66, further comprising:
means for monitoring for a second wake-up signal or a second downlink control channel associated with the second multicast session based at least in part on determining to monitor the second multicast session.

68. The apparatus of claim 61, wherein the indication instructs the UE to monitor at least one multicast session, the method further comprising monitoring all active durations associated with the at least one multicast session during a wake-up cycle of the first multicast session based at least in part on the indication.

69. The apparatus of claim 61, wherein the means for determining whether to monitor one or more of the set of multicast sessions comprises:
means for refraining from monitoring the one or more of the set of multicast sessions during a wake-up cycle of the first multicast session based at least in part on the indication.

70. The apparatus of claim 61, wherein the means for receiving the wake-up signal comprises:
means for receiving downlink control information (DCI) that includes the wake-up signal, the DCI associated with a wake-up multicast radio network temporary identifier common to all UEs in a cell supported by the base station.

71. The apparatus of claim 61, further comprising:
means for receiving a downlink control message from the base station indicating respective wake-up multicast radio network temporary identifiers for each of the set of multicast sessions configured for the UE.

72. The apparatus of claim 71, wherein the downlink control message is received via radio resource control (RRC) signaling, downlink control information (DCI), or a medium access control (MAC) control element (MAC-CE).

73. The apparatus of claim 61, wherein the means for receiving the one or more wake-up signal configurations comprises:
means for receiving a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

74. The apparatus of claim 61, wherein the means for receiving the one or more wake-up signal configurations comprises:
means for receiving at least one of a number of multicast sessions associated with the set of multicast sessions, a discontinuous reception configuration, or one or more radio network temporary identifiers associated with the set of multicast sessions.

75. The apparatus of claim 61, wherein the means for receiving the one or more wake-up signal configurations comprises:
means for receiving the one or more wake-up signal configurations via radio resource control (RRC) signaling, downlink control information (DCI), or a medium access control (MAC) control element (MAC-CE).

76. The apparatus of claim 61, wherein the means for receiving the wake-up signal comprises:
means for receiving the wake-up signal before the active duration of a discontinuous reception cycle associated with the first multicast session.

77. The apparatus of claim 61, further comprising:
means for selecting the first multicast session of the set of multicast sessions for monitoring by the UE based at least in part on a length of a discontinuous reception cycle associated with the first multicast session.

78. The apparatus of claim 77, wherein the length of the discontinuous reception cycle corresponding to a longest length or shortest length of all multicast sessions of the set of multicast sessions.

79. An apparatus for wireless communications at a base station, comprising:
means for identifying a set of multicast sessions configured for a user equipment (UE);
means for transmitting one or more wake-up signal configurations for the set of multicast sessions to the UE, the one or more wake-up signal configurations indicating respective identifiers for each of the set of multicast sessions;
means for determining which of the set of multicast sessions the UE is to monitor during a wake-up cycle associated with a first multicast session of the set of multicast sessions; and
means for transmitting a wake-up signal before an active duration of the first multicast session, the wake-up signal indicating which of the set of multicast sessions the UE is to monitor during the wake-up cycle associated with the first multicast session of the set of multicast sessions based at least in part on the determining.

80. The apparatus of claim 79, wherein the means for transmitting the wake-up signal comprises:
means for transmitting a set of indicators corresponding to the set of multicast sessions in the wake-up signal, the set of indicators indicating which of the set of multicast sessions the UE is to monitor, wherein each of the set of indicators corresponds to a respective multicast session of the set of multicast sessions, and wherein each indicator instructs the UE whether to monitor the respective multicast session.

81. The apparatus of claim 79, further comprising:
means for determining that the UE is to refrain from monitoring for a downlink control channel during a second active duration associated with a second multicast session, wherein the wake-up signal comprises a wake-up indicator having a value indicating that the UE is to refrain from monitoring for the downlink control channel of the second multicast session.

82. The apparatus of claim 79, further comprising:
means for determining that the UE is to monitor for a downlink control channel during a second active duration associated with a second multicast session, wherein the wake-up signal comprises a wake-up indicator having a value indicating that the UE is to monitor for the downlink control channel of the second multicast session.

83. The apparatus of claim 79, further comprising:
means for determining that the UE is to monitor for a second wake-up signal before a second active duration associated with a second multicast session, wherein the wake-up signal comprises a wake-up indicator having a value indicating that the UE is to monitor for the second wake-up signal of the second multicast session.

84. The apparatus of claim 79, further comprising:
means for determining that the UE is to monitor for a downlink control channel during the active duration of the first multicast session, wherein the wake-up signal comprises a first wake-up indicator having a first value indicating that the UE is to monitor for the downlink control channel of the first multicast session; and
means for determining that the UE is to monitor a second multicast session, wherein the wake-up signal comprises a second wake-up indicator having a second value indicating that the UE is to monitor the second multicast session.

85. The apparatus of claim 79, wherein the means for transmitting the one or more wake-up signal configurations comprises:
means for transmitting a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

86. The apparatus of claim 79, wherein the means for transmitting the one or more wake-up signal configurations comprises:
means for transmitting at least one of a number of multicast sessions associated with the set of multicast sessions, a discontinuous reception configuration, or one or more radio network temporary identifiers associated with the set of multicast sessions.

87. The apparatus of claim 79, wherein the means for transmitting the one or more wake-up signal configurations comprises:
means for transmitting the one or more wake-up signal configurations via radio resource control (RRC) signaling, downlink control information (DCI), or a medium access control (MAC) control element (MAC-CE).

88. The apparatus of claim 79, further comprising:
means for transmitting downlink control information (DCI) including the wake-up signal in a wake-up occasion associated with the first multicast session.

89. The apparatus of claim 88, wherein the DCI is for a group of UEs including the UE supported by a cell of the base station.

90. The apparatus of claim 88, wherein the DCI is scrambled with a wake-up multicast radio network temporary identifier specific to the first multicast session.

91. A non-transitory computer-readable medium storing code for wireless communications at a user equipment (UE), the code comprising instructions executable by a processor to:
- receive, from a base station, a configuration indicating one or more wake-up signal configurations associated with a set of multicast sessions configured for the UE;
- monitor, during a wake-up occasion of a first multicast session of the set of multicast sessions and before an active duration of the first multicast session, for a wake-up signal based at least in part on the one or more wake-up signal configurations;
- receive the wake-up signal based at least in part on the monitoring, the wake-up signal comprising an indication of which of the set of multicast sessions the UE is to monitor; and
- determine whether to monitor one or more of the set of multicast sessions based at least in part on the indication of which of the set of multicast sessions the UE is to monitor.

92. The non-transitory computer-readable medium of claim 91, wherein the instructions are further executable to:
- receive a set of indicators corresponding to the set of multicast sessions in the wake-up signal, wherein each of the set of indicators corresponds to a respective multicast session of the set of multicast sessions;
- determine which of the set of multicast sessions to the UE is to monitor based at least in part on the set of indicators; and
- monitor the one or more of the set of multicast sessions based at least in part on determining which of the set of multicast sessions to the UE is to monitor.

93. The non-transitory computer-readable medium of claim 91, wherein the instructions to determine whether to monitor one or more of the set of multicast sessions are executable to:
- determine to refrain from monitoring for a downlink control channel during a second active duration associated with a second multicast session based at least in part on the indication comprising a wake-up indicator having a value indicating that the UE is to refrain from monitoring for the downlink control channel of the second multicast session.

94. The non-transitory computer-readable medium of claim 91, wherein the instructions to determine whether to monitor one or more of the set of multicast sessions are executable to:
- determine to monitor for a downlink control channel during a second active duration associated with a second multicast session based at least in part on the indication comprising a wake-up indicator having a value indicating that the UE is to monitor for the downlink control channel of the second multicast session.

95. The non-transitory computer-readable medium of claim 91, wherein the instructions to determine whether to monitor one or more of the set of multicast sessions are executable to:
- determine to monitor for a second wake-up signal before a second active duration associated with a second multicast session based at least in part on the indication comprising a wake-up indicator having a value indicating that the UE is to monitor for the second wake-up signal of the second multicast session.

96. The non-transitory computer-readable medium of claim 91, wherein the instructions to determine whether to monitor one or more of the set of multicast sessions are executable to:
- determine to monitor for a downlink control channel during the active duration of the first multicast session based at least in part on the indication comprising a first wake-up indicator having a first value indicating that the UE is to monitor for the downlink control channel of the first multicast session; and
- determine to monitor a second multicast session of the set of multicast sessions based at least in part on the indication comprising a second wake-up indicator having a second value indicating that the UE is to monitor for the second multicast session.

97. The non-transitory computer-readable medium of claim 96, wherein the instructions are further executable to:
- monitor for a second wake-up signal or a second downlink control channel associated with the second multicast session based at least in part on determining to monitor the second multicast session.

98. The non-transitory computer-readable medium of claim 91, wherein the indication instructs the UE to monitor at least one multicast session, the method further comprising monitoring all active durations associated with the at least one multicast session during a wake-up cycle of the first multicast session based at least in part on the indication.

99. The non-transitory computer-readable medium of claim 91, wherein the instructions to determine whether to monitor one or more of the set of multicast sessions are executable to:
- refrain from monitoring the one or more of the set of multicast sessions during a wake-up cycle of the first multicast session based at least in part on the indication.

100. The non-transitory computer-readable medium of claim 91, wherein the instructions to receive the wake-up signal are executable to:
- receive downlink control information (DCI) that includes the wake-up signal, the DCI associated with a wake-up multicast radio network temporary identifier common to all UEs in a cell supported by the base station.

101. The non-transitory computer-readable medium of claim 91, wherein the instructions are further executable to:
- receive a downlink control message from the base station indicating respective wake-up multicast radio network temporary identifiers for each of the set of multicast sessions configured for the UE.

102. The non-transitory computer-readable medium of claim 101, wherein the downlink control message is received via radio resource control (RRC) signaling, downlink control information (DCI), or a medium access control (MAC) control element (MAC-CE).

103. The non-transitory computer-readable medium of claim 91, wherein the instructions to receive the one or more wake-up signal configurations are executable to:
- receive a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

104. The non-transitory computer-readable medium of claim 91, wherein the instructions to receive the one or more wake-up signal configurations are executable to:
receive at least one of a number of multicast sessions associated with the set of multicast sessions, a discontinuous reception configuration, or one or more radio network temporary identifiers associated with the set of multicast sessions.

105. The non-transitory computer-readable medium of claim 91, wherein the instructions to receive the one or more wake-up signal configurations are executable to:
receive the one or more wake-up signal configurations via radio resource control (RRC) signaling, downlink control information (DCI), or a medium access control (MAC) control element (MAC-CE).

106. The non-transitory computer-readable medium of claim 91, wherein the instructions to receive the wake-up signal are executable to:
receive the wake-up signal before the active duration of a discontinuous reception cycle associated with the first multicast session.

107. The non-transitory computer-readable medium of claim 91, wherein the instructions are further executable to:
select the first multicast session of the set of multicast sessions for monitoring by the UE based at least in part on a length of a discontinuous reception cycle associated with the first multicast session.

108. The non-transitory computer-readable medium of claim 107, wherein the length of the discontinuous reception cycle corresponding to a longest length or shortest length of all multicast sessions of the set of multicast sessions.

109. A non-transitory computer-readable medium storing code for wireless communications at a base station, the code comprising instructions executable by a processor to:
identify a set of multicast sessions configured for a user equipment (UE);
transmit one or more wake-up signal configurations for the set of multicast sessions to the UE, the one or more wake-up signal configurations indicating respective identifiers for each of the set of multicast sessions;
determine which of the set of multicast sessions the UE is to monitor during a wake-up cycle associated with a first multicast session of the set of multicast sessions; and
transmit a wake-up signal before an active duration of the first multicast session, the wake-up signal indicating which of the set of multicast sessions the UE is to monitor during the wake-up cycle associated with the first multicast session of the set of multicast sessions based at least in part on the determining.

110. The non-transitory computer-readable medium of claim 109, wherein the instructions to transmit the wake-up signal are executable to:
transmit a set of indicators corresponding to the set of multicast sessions in the wake-up signal, the set of indicators indicating which of the set of multicast sessions the UE is to monitor, wherein each of the set of indicators corresponds to a respective multicast session of the set of multicast sessions, and wherein each indicator instructs the UE whether to monitor the respective multicast session.

111. The non-transitory computer-readable medium of claim 109, wherein the instructions are further executable to:
determine that the UE is to refrain from monitoring for a downlink control channel during a second active duration associated with a second multicast session, wherein the wake-up signal comprises a wake-up indicator having a value indicating that the UE is to refrain from monitoring for the downlink control channel of the second multicast session.

112. The non-transitory computer-readable medium of claim 109, wherein the instructions are further executable to:
determine that the UE is to monitor for a downlink control channel during a second active duration associated with a second multicast session, wherein the wake-up signal comprises a wake-up indicator having a value indicating that the UE is to monitor for the downlink control channel of the second multicast session.

113. The non-transitory computer-readable medium of claim 109, wherein the instructions are further executable to:
determine that the UE is to monitor for a second wake-up signal before a second active duration associated with a second multicast session, wherein the wake-up signal comprises a wake-up indicator having a value indicating that the UE is to monitor for the second wake-up signal of the second multicast session.

114. The non-transitory computer-readable medium of claim 109, wherein the instructions are further executable to:
determine that the UE is to monitor for a downlink control channel during the active duration of the first multicast session, wherein the wake-up signal comprises a first wake-up indicator having a first value indicating that the UE is to monitor for the downlink control channel of the first multicast session; and
determine that the UE is to monitor a second multicast session, wherein the wake-up signal comprises a second wake-up indicator having a second value indicating that the UE is to monitor the second multicast session.

115. The non-transitory computer-readable medium of claim 109, wherein the instructions to transmit the one or more wake-up signal configurations are executable to:
transmit a number of multicast sessions in one DCI scrambled with a multicast radio network temporary identifier, a discontinuous reception configuration for the one or more wake-up signal configurations including at least a discontinuous reception cycle and a time offset of respective active durations associated with each of the one or more of the set of multicast sessions, respective wake-up multicast radio network temporary identifiers for each of the set of multicast sessions configured for the UE, or any combination thereof.

116. The non-transitory computer-readable medium of claim 109, wherein the instructions to transmit the one or more wake-up signal configurations are executable to:
transmit at least one of a number of multicast sessions associated with the set of multicast sessions, a discontinuous reception configuration, or one or more radio network temporary identifiers associated with the set of multicast sessions.

117. The non-transitory computer-readable medium of claim 109, wherein the instructions to transmit the one or more wake-up signal configurations are executable to:
transmit the one or more wake-up signal configurations via radio resource control (RRC) signaling, downlink control information (DCI), or a medium access control (MAC) control element (MAC-CE).

118. The non-transitory computer-readable medium of claim 109, wherein the instructions are further executable to:
transmit downlink control information (DCI) including the wake-up signal in a wake-up occasion associated with the first multicast session.

119. The non-transitory computer-readable medium of claim 118, wherein the DCI is for a group of UEs including the UE supported by a cell of the base station.

120. The non-transitory computer-readable medium of claim 118, wherein the DCI is scrambled with a wake-up multicast radio network temporary identifier specific to the first multicast session.

* * * * *